United States Patent
Czompo et al.

(10) Patent No.: US 9,891,054 B2
(45) Date of Patent: Feb. 13, 2018

(54) INERTIAL SENSOR AIDED HEADING AND POSITIONING FOR GNSS VEHICLE NAVIGATION

(75) Inventors: Joseph Czompo, Santa Clara, CA (US); Guttorm R. Opshaug, San Diego, CA (US); Ashutosh Joshi, San Diego, CA (US); Ning Luo, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 932 days.

(21) Appl. No.: 13/309,522

(22) Filed: Dec. 1, 2011

(65) Prior Publication Data

US 2012/0173140 A1    Jul. 5, 2012

Related U.S. Application Data

(60) Provisional application No. 61/440,730, filed on Feb. 8, 2011, provisional application No. 61/433,124, filed
(Continued)

(51) Int. Cl.
| | |
|---|---|
| *G01C 21/16* | (2006.01) |
| *G01C 21/26* | (2006.01) |
| *G01C 25/00* | (2006.01) |

(52) U.S. Cl.
CPC ........... *G01C 21/165* (2013.01); *G01C 21/26* (2013.01); *G01C 25/005* (2013.01)

(58) Field of Classification Search
CPC ...... G01C 21/10; G01C 21/16; G01C 21/165; G01C 21/18; G01S 19/45; G01S 19/47
(Continued)

(56) References Cited

U.S. PATENT DOCUMENTS

| | | |
|---|---|---|
| 5,617,317 A | 4/1997 | Ignagni |
| 6,240,368 B1 | 5/2001 | Kreft |
(Continued)

FOREIGN PATENT DOCUMENTS

| | | |
|---|---|---|
| CN | 101099075 A | 1/2008 |
| CN | 101493335 | 7/2009 |
(Continued)

OTHER PUBLICATIONS

International Search Report and Written Opinion—PCT/US2011/063184—ISA/EPO—dated Mar. 29, 2012.
(Continued)

*Primary Examiner* — Manuel L Barbee
(74) *Attorney, Agent, or Firm* — Silicon Valley Patent Group LLP

(57) ABSTRACT

An apparatus and method for providing an improved heading estimate of a mobile device in a vehicle is presented. First, the mobile device determines if it is mounted in a cradle attached to the vehicle; if so, inertia sensor data may be valid. While in a mounted stated, the mobile device determines whether it has been rotated in the cradle; if so, inertia sensor data may no longer be reliable and a recalibration to determine a new relative orientation between the vehicle and the mobile device is needed. If the mobile device is mounted and not recently rotated, heading data from multiple sensors (e.g., GPS, gyroscope, accelerometer) may be computed and combined to form the improved heading estimate. This improved heading estimate may be used to form an improved velocity estimate. The improved heading estimate may also be used to compute a bias to correct a gyroscope.

20 Claims, 19 Drawing Sheets

Related U.S. Application Data on Jan. 14, 2011, provisional application No. 61/419,786, filed on Dec. 3, 2010.

(58) Field of Classification Search
USPC .............. 702/150, 151, 153, 154; 73/503.3, 73/514.01
See application file for complete search history.

(56) References Cited

U.S. PATENT DOCUMENTS

| | | |
|---|---|---|
| 6,789,014 B1 | 9/2004 | Rekow et al. |
| 7,987,046 B1 | 7/2011 | Peterman et al. |
| 8,843,290 B2 | 9/2014 | Kulik et al. |
| 2001/0039467 A1 | 11/2001 | Katz et al. |
| 2002/0029110 A1 | 3/2002 | Fukuda et al. |
| 2004/0172173 A1* | 9/2004 | Goto et al. .................. 701/1 |
| 2004/0203866 A1 | 10/2004 | Sahinoglu et al. |
| 2006/0038718 A1 | 2/2006 | Arakane et al. |
| 2006/0105817 A1 | 5/2006 | Naick et al. |
| 2006/0176162 A1 | 8/2006 | Miekley et al. |
| 2007/0088477 A1 | 4/2007 | Brewer et al. |
| 2007/0118326 A1 | 5/2007 | Starodubtsev et al. |
| 2008/0109166 A1 | 5/2008 | Takaoka et al. |
| 2008/0114534 A1 | 5/2008 | Yamazaki et al. |
| 2008/0114545 A1 | 5/2008 | Takaoka et al. |
| 2008/0269988 A1 | 10/2008 | Feller et al. |
| 2009/0069987 A1 | 3/2009 | Omelchenko et al. |
| 2009/0271109 A1 | 10/2009 | Lee et al. |
| 2010/0029198 A1 | 2/2010 | Hules et al. |
| 2010/0159947 A1 | 6/2010 | Imafuku |
| 2010/0256857 A1 | 10/2010 | Lee et al. |
| 2010/0304754 A1 | 12/2010 | Czompo et al. |
| 2011/0141006 A1 | 6/2011 | Rabu |
| 2011/0202305 A1 | 8/2011 | Willis et al. |
| 2012/0041702 A1 | 2/2012 | Toda et al. |
| 2012/0173142 A1 | 7/2012 | Czompo et al. |
| 2012/0173190 A1 | 7/2012 | Czompo et al. |
| 2012/0173195 A1 | 7/2012 | Opshaug et al. |
| 2012/0217958 A1 | 8/2012 | Oka et al. |

FOREIGN PATENT DOCUMENTS

| | | |
|---|---|---|
| CN | 101571400 | 11/2009 |
| EP | 0567268 A1 | 10/1993 |
| EP | 0763749 A1 | 3/1997 |
| EP | 1443307 A2 | 8/2004 |
| JP | S5970547 | 4/1984 |
| JP | 08153180 | 6/1996 |
| JP | 11072336 | 3/1999 |
| JP | 2001503519 | 3/2001 |
| JP | 2004163404 | 6/2004 |
| JP | 2004239643 | 8/2004 |
| JP | 2005147696 A | 6/2005 |
| JP | 2007108326 A | 4/2007 |
| JP | 2007278983 A | 10/2007 |
| JP | 2008151731 | 7/2008 |
| JP | 2009257943 A | 11/2009 |
| JP | 2009300195 A | 12/2009 |
| JP | 2010271086 | 12/2010 |
| KR | 20070049821 | 5/2007 |
| WO | 9820359 | 5/1998 |
| WO | WO9849577 | 11/1998 |
| WO | WO9904280 A1 | 1/1999 |
| WO | 2006072997 | 7/2006 |
| WO | WO2009095986 A1 | 8/2009 |
| WO | WO-2012012775 | 1/2012 |

OTHER PUBLICATIONS

Davidson P., et al., "Improved Vehicle Positioning in Urban Environment through Integration of GPS and Low-Cost Inertial Sensors," 2009, 7 pages.

Li Y., et al., "A low-cost attitude heading reference system by combination of GPS and magnetometers and MEMS inertial sensors for mobile applications," Journal of Global Positioning Systems, 2006, vol. 5 (1), pp. 88-95.

* cited by examiner $$\hat{H}(k) = w \cdot H_{GNSS}(k) + (1-w)\left[\hat{H}(k-1) + \Delta T_{GNSS} \cdot \dot{H}_{Gyro}(k)\right]$$

$$w = \frac{\left(\sigma^2_{\hat{H}(k)} + \Delta T^2_{GNSS} \cdot \sigma^2_{\dot{H}_{Gyro}(k)}\right)}{\left(\sigma^2_{H_{GNSS}(k)} + \sigma^2_{\hat{H}(k)} + \Delta T^2_{GNSS} \cdot \sigma^2_{\dot{H}_{Gryo}(k)}\right)}$$

INERTIAL SENSOR AIDED HEADING AND POSITIONING FOR GNSS VEHICLE NAVIGATION

CROSS-REFERENCE TO RELATED APPLICATIONS

This application claims the benefit of and priority under 35 U.S.C. § 119(e) to U.S. Provisional Application No. 61/440,730, filed Feb. 8, 2011, and titled "Inertial Sensor Aided Heading and Positioning for GNSS Vehicle Navigation", which is incorporated herein by reference. This application also claims the benefit of and priority under 35 U.S.C. § 119(e) to U.S. Provisional Application No. 61/433,124, filed Jan. 14, 2011, and titled "Inertial Sensor Aided Heading and Positioning for GNSS Vehicle Navigation", which is incorporated herein by reference. This application further claims the benefit of and priority under 35 U.S.C. § 119(e) to U.S. Provisional Application No. 61/419,786, filed Dec. 3, 2010, and titled "Inertial Sensor Aided Heading and Positioning for GNSS Vehicle Navigation", which is incorporated herein by reference.

BACKGROUND

I. Field of the Invention

This disclosure relates generally to apparatus and methods for determining headings in a wireless device, and more particularly to determining headings base on a combination of headings.

II. Background

Mobile devices used for navigation in a car or other vehicle sometimes use Global Navigation Satellite Systems (GNSS) positioning information in addition to accelerometer and gyroscope sensor measurements to formulate a current speed and heading. Such sensor measurements are most valuable when the mobile device "knows" how it is oriented with respect to the car. For example, the mobile device may be mounted in a cradle or other fixed structure in the car. Thus, when the mobile device experiences motion, the car is usually experiencing the same motion. On the other hand, if the mobile device is in a shirt pocket or sliding around on a seat or dashboard, then the mobile device motion and the car motion are correlated but not identical.

To determine whether a mobile device is mounted in a cradle, the cradle may have an electronic switch that is activated depending on whether the mobile device is in a mounted state. Each of these known cradles requires an extra switch on the cradle and an extra interface on the mobile device. Therefore, a means, without using extra cradle hardware, to detect whether a mobile device is mounted in a cradle is desired. Also, if a cradle provides pivoting or displacement with respect to the car, the relative relationship between the mobile device and car will change. Assuming that this relationship is permanently fixed while the mobile device is in its cradle is invalid with such pivoting cradles. Therefore, a means to detect when a mounted mobile device has been repositioned is desired.

In addition, many mobile devices provide heading information to a user for purposes of position location, navigation and routing. This heading information may be based on dead reckoning from sensor measurements and/or GNSS information. Such sensors include accelerometers and gyroscopes. Methods have long been desired to better select, weight and combine sensor measurements with GNSS information to provide a user with a more reliable and improved heading.

In addition to heading information, mobile devices include Kalman filters to predict a next GNSS position and velocity. The Kalman filter can better predicted the position and velocity with error feedback. Methods to provide an improve error feedback signal have long been desired.

Sensor calibration typically requires a mobile device to be stationary or traveling at a constant velocity. Methods to calibrate sensors, including gyroscopes, that have no such restraints are also desired.

BRIEF SUMMARY

Disclosed is an apparatus and method for providing and using an accurate and improved heading for a mobile device in a vehicle. Before an improved heading estimate is determined, the mobile device determines if the mobile device is in a mounted state in a cradle attached to the vehicle; if so, then inertia sensor data may be valid. If already in a mounted stated, the mobile device determines whether the mobile device has been rotated in the cradle; if so, then inertia sensor data may no longer be reliable and a recalibration to determine a new relative orientation between the vehicle and the mobile device is needed. If the mounted state of the device is known such that the mobile device is mounted and not recently rotated, heading data from multiple sensors (e.g., GPS, gyroscope, accelerometer) may be computed and combined to form an improved heading estimate. This improved heading estimate may be used to form an improved velocity estimate. The improved heading estimate may also be used to compute a bias to correct gyroscope calibration.

According to some aspects, disclosed is a method in a mobile device to detect if the mobile device is unmounted, the method comprising: receiving accelerometer measurements $\vec{a}$; determining an average $\vec{a}_{AVG}$ of the accelerometer measurements $\vec{a}$; computing a parameter p based on the accelerometer measurements $\vec{a}$; computing a variance $\sigma_p^2$ of the parameter; comparing the variance $\sigma_p^2$ to a threshold; and declaring the mobile device is unmounted based on the variance $\sigma_p^2$ being greater than the threshold.

According to some aspects, disclosed is a mobile device to detect if the mobile device is unmounted, the mobile device comprising: an inertial measurement unit comprising an accelerometer; a processor coupled to the inertial measurement unit; and memory coupled to the processor, comprising code for: receiving accelerometer measurements $\vec{a}$; determining an average $\vec{a}_{AVG}$ of the accelerometer measurements $\vec{a}$; computing a parameter p based on the accelerometer measurements $\vec{a}$; computing a variance $\sigma_p^2$ of the parameter; comparing the variance $\sigma_p^2$ to a threshold; and declaring the mobile device is unmounted based on the variance $\sigma_p^2$ being greater than the threshold.

According to some aspects, disclosed is a mobile device to detect if the mobile device is unmounted, the mobile device comprising: means for receiving accelerometer measurements $\vec{a}$; means for determining an average $\vec{a}_{AVG}$ of the accelerometer measurements $\vec{a}$; means for computing a parameter p based on the accelerometer measurements $\vec{a}$; means for computing a variance $\sigma_p^2$ of the parameter; means for comparing the variance $\sigma_p^2$ to a threshold; and means for declaring the mobile device is unmounted based on the variance $\sigma_p^2$ being greater than the threshold.

According to some aspects, disclosed is a method in a mobile device to detect if the mobile device is unmounted, the method comprising: receiving gyroscope measurements $\vec{\omega}$; determining an average $\vec{\omega}_{AVG}$ of the gyroscope measurements $\vec{\omega}$; computing a parameter p based on the gyroscope measurement $\vec{\omega}$; computing a variance $\sigma_p^2$ of the parameter; comparing the variance $\sigma_p^2$ to a threshold; and declaring the mobile device is unmounted based on the variance $\sigma_p^2$ being greater than the threshold.

According to some aspects, disclosed is a mobile device to detect if the mobile device is unmounted, the mobile device comprising: an inertial measurement unit comprising a gyroscope; a processor coupled to the inertial measurement unit; and memory coupled to the processor, comprising code for: receiving gyroscope measurements $\vec{\omega}$; determining an average $\vec{\omega}_{AVG}$ of the gyroscope measurements $\vec{\omega}$; computing a parameter p based on the gyroscope measurement $\vec{\omega}$; computing a variance $\sigma_p^2$ of the parameter; comparing the variance $\sigma_p^2$ to a threshold; and declaring the mobile device is unmounted based on the variance $\sigma_p^2$ being greater than the threshold.

According to some aspects, disclosed is a mobile device to detect if the mobile device is unmounted, the mobile device comprising: means for receiving gyroscope measurements $\vec{\omega}$; means for determining an average $\vec{\omega}_{AVG}$ of the gyroscope measurements $\vec{\omega}$; means for computing a parameter p based on the gyroscope measurement $\vec{\omega}$; means for computing a variance $\sigma_p^2$ of the parameter; means for comparing the variance $\sigma_p^2$ to a threshold; and means for declaring the mobile device is unmounted based on the variance $\sigma_p^2$ being greater than the threshold.

According to some aspects, disclosed is a method in a mobile device to detect if the mobile device is unmounted, the method comprising: receiving accelerometer measurements $\vec{a}$; determining an average $\vec{a}_{AVG}$ of the accelerometer measurements $\vec{a}$; computing an angle $\theta$ between the average $\vec{a}_{AVG}$ and an axis perpendicular to a viewable display on the mobile device; comparing the angle $\theta$ to 90 degrees; and declaring the mobile device is unmounted based on the angle $\theta$ being less than a threshold from 90 degrees.

According to some aspects, disclosed is a mobile device to detect if the mobile device is unmounted, the mobile device comprising: an inertial measurement unit comprising an accelerometer; a processor coupled to the inertial measurement unit; and memory coupled to the processor, comprising code for: receiving accelerometer measurements $\vec{a}$; determining an average $\vec{a}_{AVG}$ of the accelerometer measurements $\vec{a}$; computing an angle $\theta$ between the average $\vec{a}_{AVG}$ and an axis perpendicular to a viewable display on the mobile device; comparing the angle $\theta$ to 90 degrees; and declaring the mobile device is unmounted based on the angle $\theta$ being less than a threshold from 90 degrees.

According to some aspects, disclosed is a mobile device to detect if the mobile device is unmounted, the mobile device comprising: means for receiving accelerometer measurements $\vec{a}$; means for determining an average $\vec{a}_{AVG}$ of the accelerometer measurements $\vec{a}$; means for computing an angle $\theta$ between the average $\vec{a}_{AVG}$ and an axis perpendicular to a viewable display on the mobile device; means for comparing the angle $\theta$ to 90 degrees; and means for declaring the mobile device is unmounted based on the angle $\theta$ being less than a threshold from 90 degrees.

According to some aspects, disclosed is a method in a mobile device to detect if the mobile device is unmounted, the method comprising: computing variance values $\alpha_p^2$ for at least one of: a sequence of accelerometer measurements ($\vec{a}$); a sequence of averages ($\vec{a}_{AVG}$) of accelerometer measurements; a sequence of gyroscope measurements ($\vec{\omega}$); three sequences of scalar channelized gyroscope measurements ($\omega_X, \omega_Y, \omega_Z$); and a virtual gyroscope heading rate ($\vec{H}$); setting a flag if any of the variance values $\sigma_p^2$ exceed a respective threshold; and declaring the mobile device is not in a mounted state based on the flag.

According to some aspects, disclosed is a mobile device to detect if the mobile device is unmounted, the mobile device comprising: an inertial measurement unit comprising an accelerometer; a processor coupled to the inertial measurement unit; and memory coupled to the processor, comprising code for: computing variance values $\sigma_p^2$ for at least one of: a sequence of accelerometer measurements ($\vec{a}$); a sequence of averages ($\vec{a}_{AVG}$) of accelerometer measurements; a sequence of gyroscope measurements ($\vec{\omega}$); three sequences of scalar channelized gyroscope measurements ($\omega_X, \omega_Y, \omega_Z$); and a virtual gyroscope heading rate ($\vec{H}$); setting a flag if any of the variance values $\sigma_p^2$ exceed a respective threshold; and declaring the mobile device is not in a mounted state based on the flag. A mobile device to detect if the mobile device is unmounted, the mobile device comprising: means for computing variance values $\sigma_p^2$ for at least one of: a sequence of accelerometer measurements ($\vec{a}$); a sequence of averages ($\vec{a}_{AVG}$) of accelerometer measurements; a sequence of gyroscope measurements ($\vec{\omega}$); three sequences of scalar channelized gyroscope measurements ($\omega_X, \omega_Y, \omega_Z$); and a virtual gyroscope heading rate ($\vec{H}$); means for setting a flag if any of the variance values $\sigma_p^2$ exceed a respective threshold; and means for declaring the mobile device is not in a mounted state based on the flag.

According to some aspects, disclosed is a method in a mobile device for providing an improved heading, the method comprising: receiving an accelerometer measurement ($\vec{a}$) from an accelerometer; receiving a gyroscope measurement ($\vec{\omega}$) from a gyroscope; receiving a GNSS heading ($H_{GNSS}$) from a GNSS receiver; computing a gravity vector ($\vec{g}$) based on the accelerometer measurement ($\vec{a}$); computing a virtual gyroscope heading rate ($\dot{H}_{Gyro}$) based on the gyroscope measurement ($\vec{\omega}$) and the gravity vector ($\vec{g}$); and combining the GNSS heading ($H_{GNSS}$) and virtual gyroscope heading rate ($\dot{H}_{Gyro}$) to form the improved heading.

According to some aspects, disclosed is a mobile device to provide an improved heading, the mobile device comprising: an inertial measurement unit comprising an accelerometer and a gyroscope; a Global Navigation Satellite Systems receiver (GNSS receiver); a processor coupled to the inertial measurement unit and the GNSS receiver; and memory coupled to the processor, comprising code for: receiving an accelerometer measurement ($\vec{a}$) from the accelerometer; receiving a gyroscope measurement ($\vec{\omega}$) from the gyroscope; receiving a GNSS heading ($H_{GNSS}$) from the GNSS receiver; computing a gravity vector ($\vec{g}$) based on the accelerometer measurement ($\vec{a}$); computing a virtual gyroscope heading rate ($\dot{H}_{Gyro}$) based on the gyroscope measurement ($\vec{\omega}$) and the gravity vector ($\vec{g}$); and combining the GNSS heading ($H_{GNSS}$) and virtual gyroscope heading rate ($\dot{H}_{Gyro}$) to form the improved heading.

According to some aspects, disclosed is a mobile device to provide an improved heading, the mobile device comprising: means for receiving an accelerometer measurement ($\vec{a}$); means for receiving a gyroscope measurement ($\vec{\omega}$); means for receiving a GNSS heading ($H_{GNSS}$); means for computing a gravity vector ($\vec{g}$) based on the accelerometer measurement ($\vec{a}$); means for computing a virtual gyroscope heading rate ($\dot{H}_{Gyro}$) based a projection of the gyroscope measurement ($\vec{\omega}$) and the gravity vector ($\vec{g}$); and means for combining the GNSS heading ($H_{GNSS}$) and virtual gyroscope heading rate According to some aspects, disclosed is a method in a mobile device for providing an improved velocity, the method comprising: receiving an accelerometer measurement ($\vec{a}$) from an accelerometer; receiving a gyroscope measurement ($\vec{\omega}$) from a gyroscope; receiving a GNSS velocity ($\vec{V}_{GNSS}$) comprising a GNSS heading ($\vec{H}_{GNSS}$) from a GNSS receiver; computing a gravity vector ($\vec{g}$) based on the accelerometer measurement ($\vec{a}$); computing a virtual gyroscope heading rate ($\dot{H}_{Gyro}$) based on a projection of the gyroscope measurement ($\vec{\omega}$)) and the gravity vector ($\vec{g}$); combining the GNSS heading ($H_{GNSS}$) and virtual gyroscope heading rate ($\dot{H}_{Gyro}$) to form an improved heading ($\hat{H}$); and computing the improved velocity from the improved heading ($\hat{H}$).

According to some aspects, disclosed is a mobile device to provide an improved velocity, the mobile device comprising: an inertial measurement unit comprising an accelerometer and a gyroscope; a Global Navigation Satellite Systems receiver (GNSS receiver); a processor coupled to the inertial measurement unit and the GNSS receiver; and memory coupled to the processor, comprising code for: receiving an accelerometer measurement ($\vec{a}$) from the accelerometer; receiving a gyroscope measurement ($\vec{\omega}$) from the gyroscope; receiving a GNSS velocity ($\vec{V}_{GNSS}$) comprising a GNSS heading ($\vec{H}_{GNSS}$) from the GNSS receiver; computing a gravity vector ($\vec{g}$) based on the accelerometer measurement ($\vec{a}$); computing a virtual gyroscope heading rate ($\dot{H}_{Gyro}$) based on the gyroscope measurement ($\vec{\omega}$) and the gravity vector ($\vec{g}$); combining the GNSS heading ($H_{GNSS}$) and virtual gyroscope heading rate ($\dot{H}_{Gyro}$) to form an improved heading ($\hat{H}$); and computing the improved velocity from the improved heading ($\hat{H}$).

According to some aspects, disclosed is a mobile device to provide an improved velocity, the mobile device comprising: means for receiving an accelerometer measurement ($\vec{a}$) from an accelerometer; means for receiving a gyroscope measurement ($\vec{\omega}$) from a gyroscope; means for receiving a GNSS velocity ($\vec{V}_{GNSS}$) comprising a GNSS heading ($\vec{H}_{GNSS}$) from a GNSS receiver; means for computing a gravity vector ($\vec{g}$) based on the accelerometer measurement ($\vec{a}$); means for computing a virtual gyroscope heading rate ($\dot{H}_{Gyro}$) based on the gyroscope measurement ($\vec{\omega}$) and the gravity vector ($\vec{g}$); means for combining the GNSS heading ($H_{GNSS}$) and virtual gyroscope heading rate ($\dot{H}_{Gyro}$) to form an improved heading ($\hat{H}$); and means for computing the improved velocity from the improved heading ($\hat{H}$).

According to some aspects, disclosed is a method in a mobile device for generating a gyroscope bias, the method comprising: receiving at least two GNSS headings ($H_{GNSS}$) from a GNSS receiver; computing a GNSS heading difference ($\Delta H_{GNSS}$) based on the GNSS headings ($H_{GNSS}$); converting the GNSS heading difference ($\Delta H_{GNSS}$) to a negative GNSS heading rate ($-\dot{H}_{GNSS}$) by scaling by a GNSS time difference ($-\Delta T_{GNSS}$); receiving gyroscope measurements ($\vec{\omega}$) from a gyroscope; computing the virtual gyroscope heading rate ($\dot{H}_{Gyro}$) from the gyroscope measurements ($\vec{\omega}$); forming a corrected gyroscope heading rate ($\dot{H}_{Gyro,CORR}$) from the virtual gyroscope heading rate ($\dot{H}_{Gyro}$); averaging the corrected gyroscope heading rate ($\dot{H}_{Gyro,CORR}$) to form the average virtual gyroscope heading rate ($\bar{\dot{H}}_{Gyro,CORR}$); and summing the negative GNSS heading rate ($-\dot{H}_{GNSS}$) and the virtual gyroscope heading rate ($\bar{\dot{H}}_{Gyro}$) to form the gyroscope bias.

According to some aspects, disclosed is a mobile device to generate a gyroscope bias, the mobile device comprising: an inertial measurement unit comprising an accelerometer and a gyroscope; a Global Navigation Satellite Systems receiver (GNSS receiver); a processor coupled to the inertial measurement unit and the GNSS receiver; and memory coupled to the processor, comprising code for: receiving GNSS headings ($H_{GNSS}$) from the GNSS receiver; computing a GNSS heading difference ($\Delta H_{GNSS}$) based on the GNSS headings ($H_{GNSS}$); converting the GNSS heading difference ($\Delta H_{GNSS}$) to a negative GNSS heading rate ($-\dot{H}_{GNSS}$) by scaling by a GNSS time difference ($-\Delta T_{GNSS}$); receiving gyroscope measurements ($\vec{\omega}$) from the gyroscope; computing the virtual gyroscope heading rate ($\dot{H}_{Gyro}$) from the gyroscope measurements ($\vec{\omega}$); forming a corrected gyroscope heading rate ($\dot{H}_{Gyro,CORR}$) from the virtual gyroscope heading rate ($\dot{H}_{Gyro}$); averaging the corrected gyroscope heading rate ($\dot{H}_{Gyro,CORR}$) to form the virtual gyroscope heading rate ($\bar{\dot{H}}_{Gyro,CORR}$), and summing the average heading rate ($-\dot{H}_{GNSS}$) and the virtual gyroscope heading rate ($\bar{\dot{H}}_{Gyro}$) to form the gyroscope bias.

According to some aspects, disclosed is a mobile device to generate a gyroscope bias, the mobile device comprising: means for receiving at least two GNSS headings ($H_{GNSS}$) from a GNSS receiver; means for computing an GNSS heading difference ($\Delta H_{GNSS}$) (based on the GNSS headings ($H_{GNSS}$); means for converting the GNSS heading difference ($\Delta H_{GNSS}$) to a negative GNSS heading rate ($-\dot{H}_{GNSS}$) by scaling by a GNSS time difference ($-\Delta T_{GNSS}$); means for receiving gyroscope measurements ($\vec{\omega}$) from a gyroscope; means for computing the virtual gyroscope heading rate ($\dot{H}_{Gyro}$) from the gyroscope measurements ($\vec{\omega}$); means for forming a corrected gyroscope heading rate ($\dot{H}_{Gyro,CORR}$) from the virtual gyroscope heading rate ($\dot{H}_{Gyro}$); means for averaging the corrected gyroscope heading rate ($\dot{H}_{Gyro,CORR}$) to form the virtual gyroscope heading rate ($\bar{\dot{H}}_{Gyro,CORR}$), and means for summing the negative GNSS heading rate ($-\dot{H}_{GNSS}$) and the virtual gyroscope heading rate ($\bar{\dot{H}}_{Gyro}$) to form the gyroscope bias.

According to some aspects, disclosed is a method in a mobile device for generating a gyroscope bias, the method comprising: receiving a GNSS heading ($H_{GNSS}$); receiving gyroscope measurements ($\vec{\omega}$); and computing the gyroscope bias based on the GNSS heading ($H_{GNSS}$) and the gyroscope measurements ($\vec{\omega}$).

According to some aspects, disclosed is a mobile device to generate a gyroscope bias, the mobile device comprising: an inertial measurement unit comprising an accelerometer and a gyroscope; a Global Navigation Satellite Systems receiver (GNSS receiver); a processor coupled to the inertial measurement unit and the GNSS receiver; and memory coupled to the processor, comprising code for: receiving a GNSS heading ($H_{GNSS}$); receiving gyroscope measurements ($\vec{\omega}$); and computing the gyroscope bias based on the GNSS heading ($H_{GNSS}$) and the gyroscope measurements ($\vec{\omega}$).

According to some aspects, disclosed is a mobile device to generate a gyroscope bias, the mobile device comprising: means for receiving a GNSS heading ($H_{GNSS}$); means for receiving gyroscope measurements ($\vec{\omega}$); and means for computing the gyroscope bias based on the GNSS heading ($H_{GNSS}$) and the gyroscope measurements ($\vec{\omega}$).

According to some aspects, disclosed is a method in a mobile device for detecting cradle rotation, the method comprising: determining the threshold ($\omega_{max}$) based on a GNSS magnitude ($\|\vec{V}\|$); comparing an angular rotation rate ($\|\vec{\omega}\|$) to a threshold ($\omega_{max}$); and determining a cradle rotation state based on the comparison.

According to some aspects, disclosed is a mobile device to detect cradle rotation, the mobile device comprising: an inertial measurement unit comprising an accelerometer and a gyroscope; a Global Navigation Satellite Systems receiver (GNSS receiver); a processor coupled to the inertial measurement unit and the GNSS receiver; and memory coupled to the processor, comprising code for: determining the threshold ($\omega_{max}$) based on a GNSS magnitude ($\|\vec{V}\|$); comparing an angular rotation rate ($\|\vec{\omega}\|$) to a threshold ($\omega_{max}$); and determining a cradle rotation state based on the comparison.

According to some aspects, disclosed is a mobile device to detect cradle rotation, the mobile device comprising: means for determining the threshold ($\omega_{max}$) based on a GNSS magnitude ($\|\vec{V}\|$); means for comparing an angular rotation rate ($\|\vec{\omega}\|$) to a threshold ($\omega_{max}$); and means for determining a cradle rotation state based on the comparison.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

Figure 1:
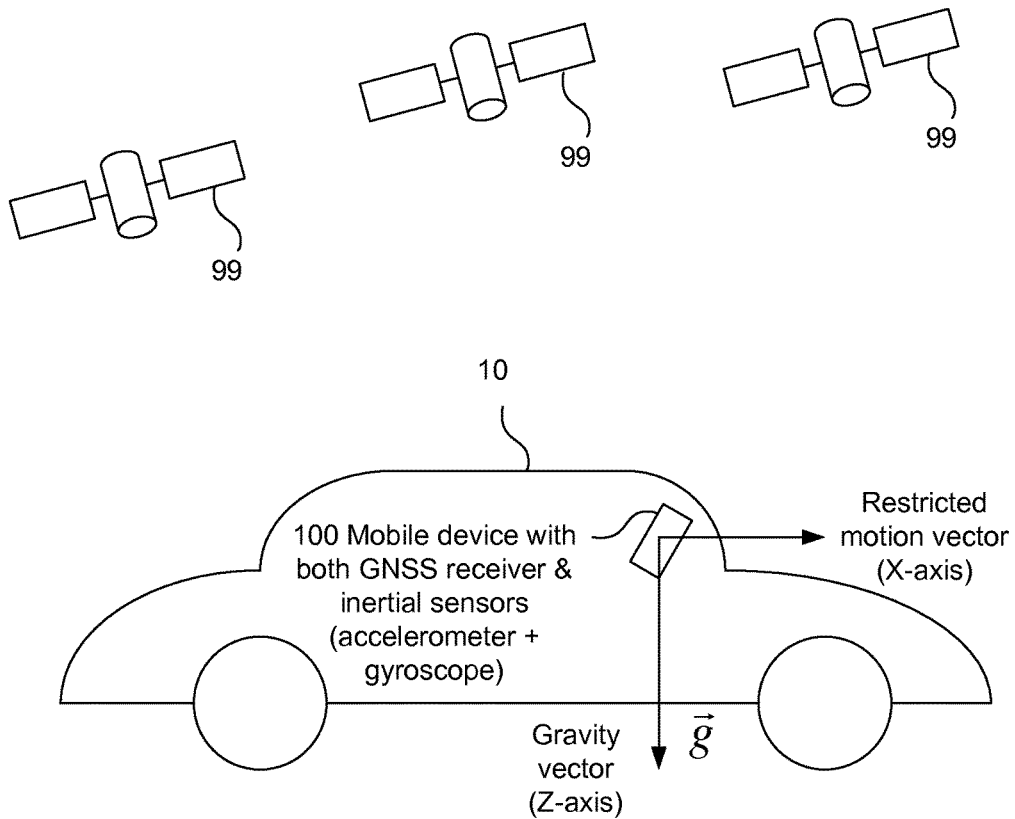
FIG. 1 illustrates a GNSS system and a side view of a car with a mounted mobile device.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device 100, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

FIG. 1 illustrates a satellite positioning system (SPS) and a side view of a car 10 with a mobile device 100 mounted in a cradle. A user may place a mobile device 100 in a cradle fixed to the car 10 or other vehicle to assist the user with navigation while traveling in the car 10. The mobile device 100 acts as a hands-free device, may display local maps and may present audio and visual routing information.

The mobile device 100 may use GNSS signals received from GNSS satellites 99 in the satellite positioning system (SPS) as well as local sensor data to estimate a current position, velocity or heading of the car 10 within a horizontal plane. This horizontal plane may be defined as the X-Y plane perpendicular to the gravity vector ($\vec{g}$), which forms the Z-axis ($\hat{z}$). The X-axis ($\hat{x}$) may be defined as the direction the car 10 is facing and the Y-axis ($\hat{y}$) (not shown) may be the yaw or lateral direction perpendicular to both the forward direction ($\hat{x}$) and the gravity vector ($\vec{g}$) in the vertical direction ($\hat{z}$).

The X, Y, and Z-axes represent a reference system local ($\hat{x},\hat{y},\hat{z}$), which is local to the car 10. The global reference system may be represented by longitude and latitude or by longitude, latitude and elevation. GNSS data is generated with respect to the global reference system. A third reference system is the body reference system, which is defined relative to the body of the mobile device 100. Sensor data is generated in the body reference system by sensors within the mobile device 100.

Motion of the car 10 may be restricted using non-holonomic constraints in the local reference system. That is, the mobile device 100 may place bounds on the car's possible movement by restricting movement of the car 10 along the X-axis.

Figure 2:
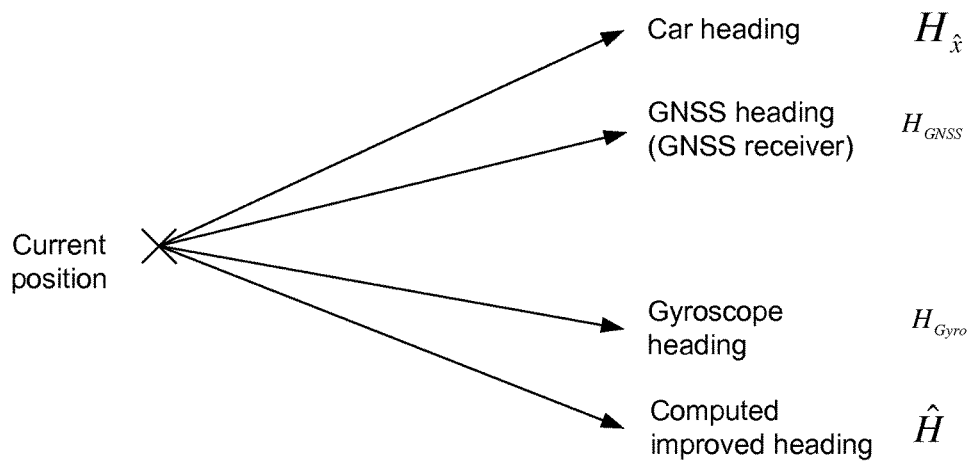
FIG. 2 shows a top view illustrating differences among headings from various sources.

FIG. 2 shows a top view illustrating differences among headings from various sources. A first heading (car heading $H_{\hat{x}}$ along $\hat{x}$) is defined by the direction the car 10 is heading or facing. In other words, the first heading is a car heading ($H_{\hat{x}}$) defined by the X-axis in the local reference system.

A second heading is a GNSS heading ($H_{GNSS}$) defined by signals from a GNSS receiver 140. The second heading may be extracted from the GNSS velocity ($\vec{V}_{GNSS}$), which may be defined as a heading and a speed.

A third heading ($H_{Gyro}$) is from a gyroscope 130.

The various headings in an ideal world are be identical. In the real world, however, these three headings are derived from different sources and over different periods; therefore, these three headings are often similar but distinct from one another. A fourth heading is an improved heading ($\hat{H}$), which is a weighted combination of two or more of these three headings and is in the direction of an improved velocity ($\hat{V}$) discussed in more detail below.

Each heading has both advantages and disadvantages. The car heading ($H_{\hat{x}}$) is simple to determine but may only be correct for an instant or have an inherent bias. The GNSS heading ($H_{GNSS}$) is accurate over the long term but less inaccurate over the short term. The gyroscope heading ($H_{Gyro}$) may be accurate over the short term but inaccurate over the long term because of accumulated error. Two or three of the headings may be restricted (e.g., using non-holonomic constraints) and combined to form the improved heading ($\hat{H}$), which attempts to combine the advantages of the individual headings while masking their disadvantages.

Figure 3:
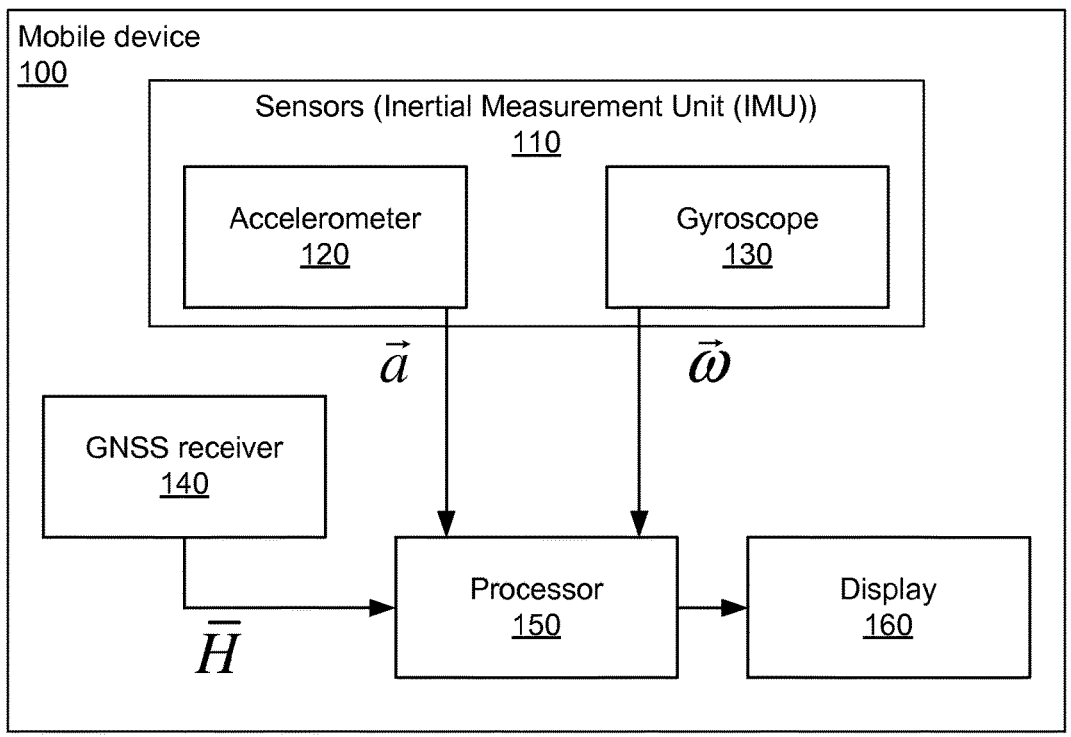
FIG. 3 shows a block diagram of a mobile device, in accordance with some embodiments of the present invention.

FIG. 3 shows a block diagram of a mobile device, in accordance with some embodiments of the present invention. The mobile device 100 includes sensors 110, also referred to as an inertial measurement unit (IMU). In this case, the sensors 110 include both an accelerometer 120 and a gyroscope 130. Both the accelerometer 120 and the gyroscope 130 may be devices generating three-dimensional measurements.

The mobile device 100 also includes a GNSS receiver 140, a processor 150 and possible a display 160. The processor 150 receives data from the accelerometer 120 in the form of three-dimensional accelerometer measurements ($\vec{a}$) referenced to the body reference system. The processor 150 receives from the gyroscope 130 an angular rate ($\vec{\omega}$), which identifies an angular change from a previous measurement. The angular rate ($\vec{\omega}$) is also a three-dimensional measurement referenced to the body reference system.

The GNSS receiver 140 provides a GNSS heading ($\overline{H}$), which may be a scalar value referenced to North (0°). The processor 150 may include memory containing the code to execute the methods described herein. Alternatively, this memory may be externally located from the processor 150. The display 160 is coupled to the processor and may be used to present map, routing information and directional information to the user. The mobile device 100 may also include a speaker for audio commands.

Figure 4:
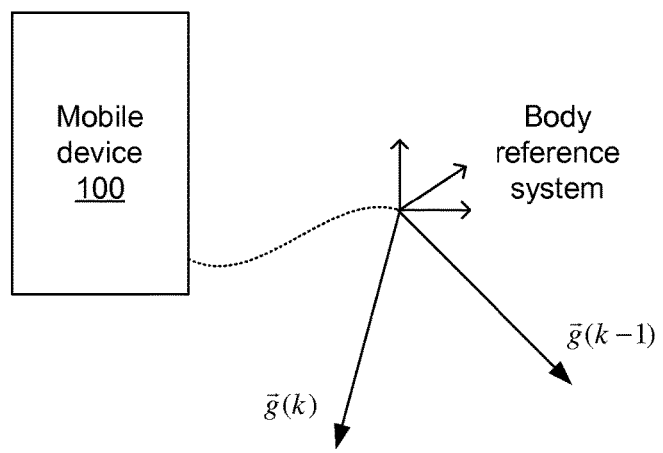
FIG. 4 shows gravity vectors with respect to a mobile device, in accordance with some embodiments of the present invention.

FIG. 4 shows gravity vectors with respect to a mobile device, in accordance with some embodiments of the present invention. When a user enters a car 10, the user may mount the mobile device 100 to a cradle or other mounting structure fixed to the car 10, for example, within the first 20 seconds. The cradle provides a fixed relationship between the body reference system of the mobile device 100 and the local reference system of the car 10. Normally, a relative orientation between the mobile device 100 and the car 10 does not change over time while the mobile device 100 is mounted in the cradle. The fixed relationship may be disturbed by a user, for example, readjusting the mobile device 100 to obtain a better viewing angle.

When the mobile device 100 is positioned in the cradle, the accelerometer 120 and the gyroscope 130 generate data directly corresponding to movement of the car 10. On the other hand, when the mobile device 100 is in a user's pocket, jacket or purse, the sensors 110 generate data only correlated to but not identical to movements of the car 10. The figure shows an example when a gravitational vector ($\vec{g}$) changes between a first time (k) and a second time (k−1). If mounted, the computed gravitational vector only changes within an error threshold.

If the computed gravitational vector changes from a first gravitation ($\vec{g}(k-1)$) to a second gravitation ($\vec{g}(k)$) greater than a threshold amount, the processor 150 may declare the mobile device 100 is not in a mounted state (if this variation changes continuously with time) or rotated within the cradle (if this variation settles on a first gravitation vector then settles on a second gravitation vector). If the processor 150 determines the mobile device 100 is not mounted, then measurements from the sensor 110 will not be directly associated with movements of the car 10

Figure 5:
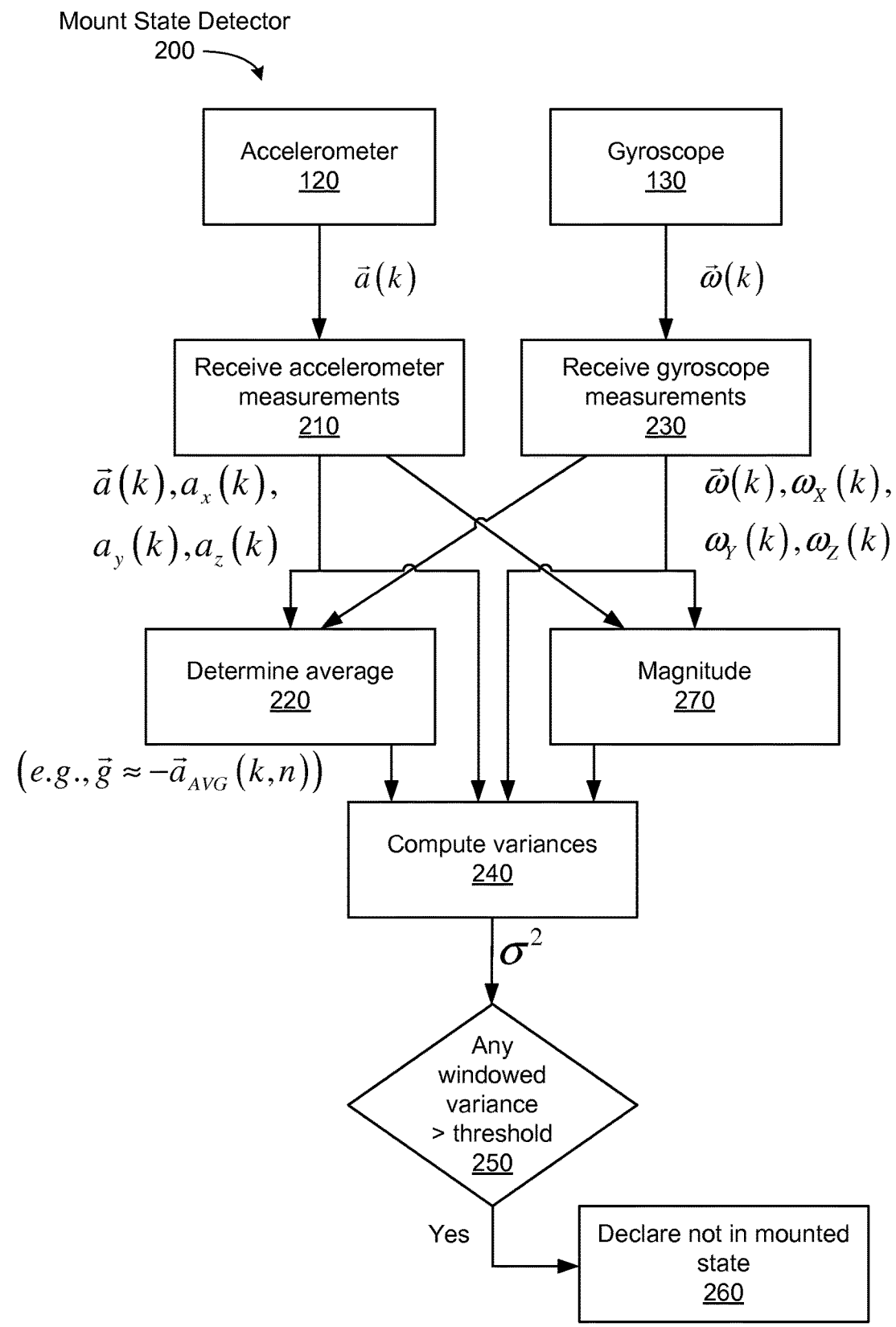
FIG. 5 is a block diagram of a mount state detector, in accordance with some embodiments of the present invention.

FIG. 5 is a block diagram of a mount state detector, in accordance with some embodiments of the present invention. This process 200 determines two or more variances from difference sequences of variables. The example here shows five variances, however, some embodiments may only use just two, three or four of these variances. For example, an embodiment may use only one acceleration-based variance (e.g., a variance of $\vec{a}$ or $\vec{a}_{AVG}$) and one gyroscope-based variance (e.g., a variance of $\vec{\omega}$ or $\omega_X, \omega_Y, \omega_Z$). Another embodiment may use only an averaged acceleration variance (e.g., a variance of $\vec{a}_{AVG}$) and one gyroscope-based variance (e.g., a variance of $\vec{\omega}$).

The sequence of variables include: (1) a three-dimensional accelerometer measurement ($\vec{a}$); (2) an averaged three-dimensional accelerometer measurement ($\vec{a}_{AVG}$); (3) a three-dimensional gyroscope measurement ($\vec{\omega}$); (4) a three-dimensional gyroscope measurement treated as three separate channels providing three separate scalar values ($\omega_X, \omega_Y, \omega_Z$); and (5) a virtual heading rate ($\overline{H}$). The first three streams each result in one variance value per time index and the fourth stream results in three variance values per time index.

At step 210, the processor 150 receives accelerometer measurements ($\vec{a}(k)$) from the accelerometer 120, which may be provided to step 220, step 240 and/or step 270 as measurements ($\vec{a}$). Alternatively, the three-dimensional accelerometer measurements ($\vec{a}(k)$) may be provided as one, two or three scalar values ($a_X, a_Y, a_Z$ or $a_X(k), a_Y(k), a_Z(k)$) where $\vec{a}(k) = a_X(k)\hat{x} + a_Y(k)\hat{y} + a_Z(k)\hat{z}$ in the body reference system. The accelerometer measurements ($\vec{a}$) may be represented as a temporal sequence a values:

$$\vec{a}(k), \vec{a}(k-1), \vec{a}(k-2), \vec{a}(k-3), \vec{a}(k-4), \ldots$$

At step 220, the processor 150 performs an average of a window of n previous measurements, if needed. For example:

$$\vec{a}_{AVG}(k) = \frac{1}{n}\sum_{i=0}^{n-1}\vec{a}(k-i)$$

The three-dimensional averaged accelerometer measurements ($\vec{a}_{AVG}$) may be represented as a temporal sequence a values:

$$\vec{a}_{AVG}(k), \vec{a}_{AVG}(k-1), \vec{a}_{AVG}(k-2), \vec{a}_{AVG}(k-3), \vec{a}_{AVG}(k-4), \ldots$$

At step 230, the processor 150 receives gyroscope measurements ($\vec{\omega}(k)$) from the gyroscope 130, which may also be provided to step 220, step 240 and/or step 270, either as three-dimensional gyroscope measurements ($\vec{\omega}$) or as the three separate channels ($\omega_X, \omega_Y, \omega_Z$). The three-dimensional gyroscope measurements ($\vec{\omega}$) may be represented in time as:

$$\vec{\omega}(k), \vec{\omega}(k-1), \vec{\omega}(k-2), \vec{\omega}(k-3), \vec{\omega}(k-4), \ldots$$

The three separate channels ($\omega_X, \omega_Y, \omega_Z$) may be represented in time as:

$$\omega_X(k), \omega_X(k-1), \omega_X(k-2), \omega_X(k-3), \omega_X(k-4), \ldots,$$

$$\omega_Y(k), \omega_Y(k-1), \omega_Y(k-2), \omega_Y(k-3), \omega_Y(k-4), \ldots \text{ and}$$

$$\omega_Z(k), \omega_Z(k-1), \omega_Z(k-2), \omega_Z(k-3), \omega_Z(k-4), \ldots$$

At step 270, the magnitude portion of the input value is passed as an output value to step 240. The processor 150 computes a magnitude from an input vector $\vec{v}(k)$ or input scalar v(k) as an output scalar $\|\vec{v}(k)\|$ or $|v(k)|$. For streams of data comprising vectors, the processor 150 computes a magnitude and produces a scalar v(k), where the input data is $\vec{v}(k)=v_X(k)\hat{x}+v_Y(k)\hat{y}+v_Z(k)\hat{z}$ (with respect to the body reference system) and the output data is $v(k)=\sqrt{v_X(k)^2+v_Y(k)^2+v_Z(k)^2}$ (also with respect to the body reference system). For streams of data comprising scalars, the scalar values $(a_X, a_Y, a_Z, \omega_X, \omega_Y, \omega_Z)$ may undergo an absolute value operation (not shown) where, for example, $v(k)=|v_X(k)|$, where the output data is $|v_X(k)|$ and the input scalar value is one or more of $(a_X, a_Y, a_Z, \omega_X, \omega_Y, \omega_Z)$. Output data may also be low pass filtered.

At step 240, the processor 150 receives one, two, three, four or five streams of input variables and computes a variance ($\sigma^2$), based on an average acceleration (from step 220) or an average heading (from step 310), for each stream at each time k. The variances are computed as described with reference to the FIG. 6 described below. This step computes a sequence of output variances corresponding to each set of input variables. For example, the processor 150 represents: the sequence of variances ($\sigma_a^2$) computed from the three-dimensional accelerometer measurements ($\vec{a}$) as $\sigma_a^2(k)$, $\sigma_a^2(k-1), \sigma_a^2(k-2), \sigma_a^2(k-3), \sigma_a^2(k-4), \ldots$; the sequence of variances ($\sigma_a^2$) computed from the averaged three-dimensional accelerometer measurements ($\vec{a}$) as $\sigma_a^2(k), \sigma_a^2(k-1)$, $\sigma_a^2(k-2), \sigma_a^2(k-3), \sigma_a^2(k-4), \ldots$; the sequence of variances ($\sigma_\omega^2$) computed from the three-dimensional gyroscope measurements ($\vec{\omega}$) as $\sigma_\omega^2(k), \sigma_\omega^2(k-1), \sigma_\omega^2(k-2), \sigma_\omega^2(k-3)$, $\sigma_\omega^2(k-4), \ldots$; and the sequence of variances ($\sigma_{\omega\_X}^2, \sigma_{\omega\_Y}^2$, $\sigma_{\omega\_Z}^2$) computed from the three separate channels ($\omega_X, \omega_Y$, $\omega_Z$) as:

$$\sigma_{\omega\_X}^2(k), \sigma_{\omega\_X}^2(k-1), \sigma_{\omega\_X}^2(k-2), \sigma_{\omega\_X}^2(k-3),$$
$$\sigma_{\omega\_X}^2(k-4), \ldots,$$

$$\sigma_{\omega\_Y}^2(k), \sigma_{\omega\_Y}^2(k-1), \sigma_{\omega\_Y}^2(k-2), \sigma_{\omega\_Y}^2(k-3),$$
$$\sigma_{\omega\_Y}^2(k-4), \ldots \text{ and}$$

$$\sigma_{\omega\_Z}^2(k), \sigma_{\omega\_Z}^2(k-1), \sigma_{\omega\_Z}^2(k-2), \sigma_{\omega\_Z}^2(k-3),$$
$$\sigma_{\omega\_Z}^2(k-4), \ldots.$$

At step 250, each of the computed variances is compared to a respective threshold to determine if any excessive linear or angular acceleration occurred. In some embodiments, a single variance exceeding the threshold triggers the processor 150 into declaring the mobile device 100 is not in a mounted state, as shown at step 260.

In other embodiments, a window of results is examined for each sequence of variances to determine if enough excessive events have occurred to declare the mobile device 100 is not in the mounted state. For example, if the variance of the acceleration measurements is greater than a fixed threshold for more than a predetermined number of times within a window of a predetermined length, then the processor 150 declares the mobile device 100 is not in the mounted state. This windowing may occur in parallel for each of the sequences of variances computed at step 240. In this case, any one of the sequence of variances exceeding its respective threshold by more than the predetermined number of times within the window can trigger the processor 150 to make the declaration of step 260 that the mobile device 100 is not in a mounted state.

Alternatively, or in addition to, the processor 150 may declare the mobile device 100 is in the mounted state or remains in a mounted state (not shown) based on variances not exceeding a respective threshold for more than a predetermined number of times over a window of a predetermined time. A hysteresis may be used to transition between the mounted and unmounted states.

Alternatively, the yes/no output of step 250 may be windowed such that a predetermined threshold number of decisions within a previous predetermined number of computations must be 'yes' in order for the declaration at step 260 to be made. For example, two or more out of the previous five determinations must be 'yes' before the declaration at step 260 is made to conclude the mobile device 100 is in a mounted state.

If the mobile device 100 is mounted, then the processor 150 assumes the body reference system is fixed with respect to the local reference system. In this case, the sensor measurements from sensor 110 in the body reference system directly represent movement of the car 10 in the local reference system, as well as the mobile device 100. That is, when processor 150 determines the mobile device 100 is mounted, the processor 150 may directly relate the two reference systems. When the processor 150 determines the mobile device 100 is not mounted, the processor 150 may disassociate the two reference systems.

Figure 6:
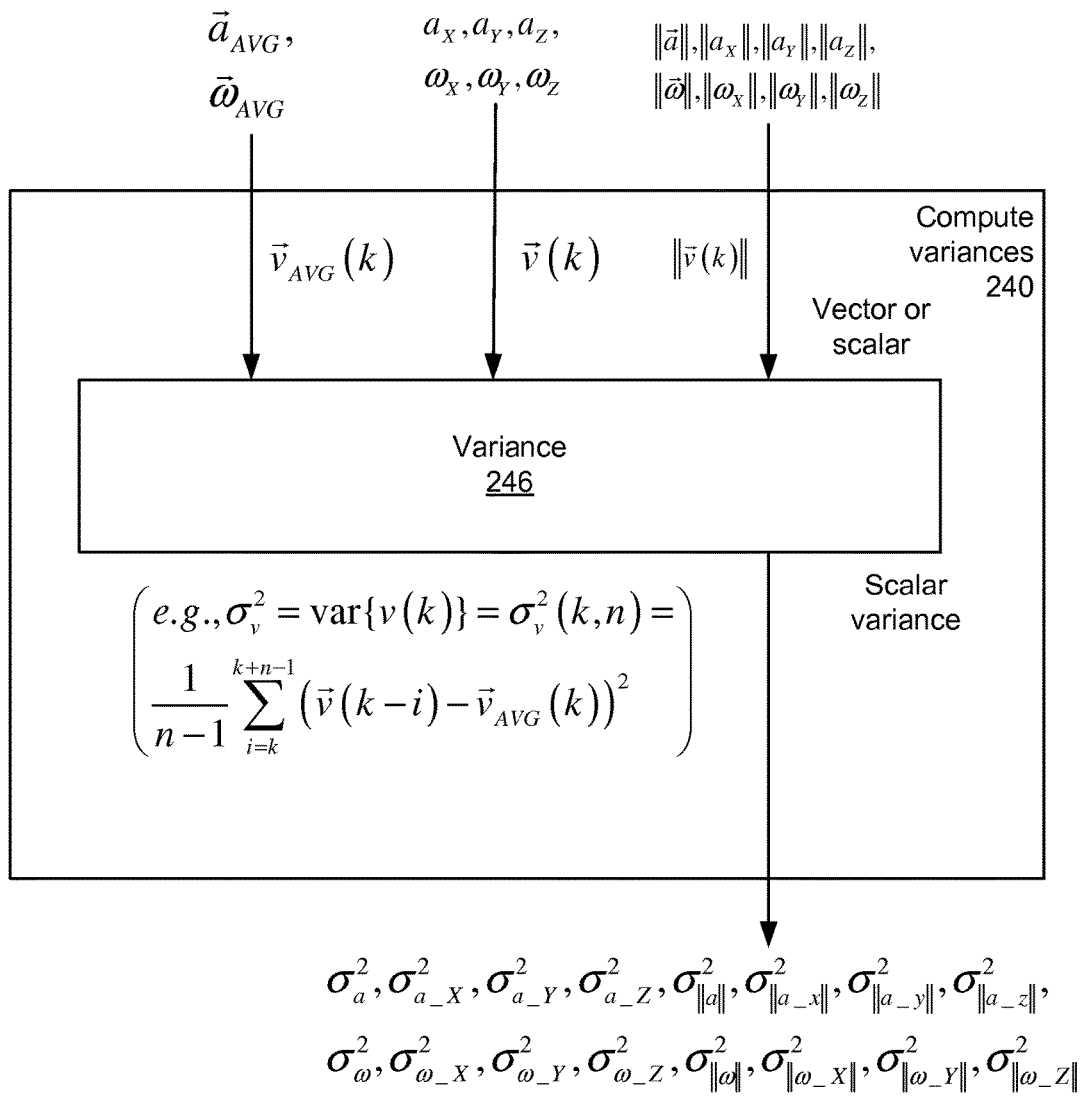
FIG. 6 is a block diagram of a unit to compute a variance.

FIG. 6 is a block diagram of a variances unit, which computes a variance ($\sigma_v^2$). As described above, the processor 150 computes a variance at step 240 for each separate stream of data. At step 220 (FIG. 5), the processor 150 computes an average ($v_{AVG}(k,n)$) over a window. For example:

$$v_{AVG}(k, n) = \frac{1}{n}\sum_{i=0}^{n-1} v(k-i),$$

where the window size is n samples and k is the current index to measurements from the accelerometer 120 or gyroscope 130.

At step 246, the processor 150 uses the vector value $\vec{v}(k)$ or scalar value v(k) and/or the averaged value ($v_{AVG}(k)$) to compute a variance ($\sigma_v^2$). The variance may be denoted as $\sigma_v^2 = \text{var}\{v(k)\}$. As a result, the processor 150 accepts one, two, three, four or five or more streams in parallel to produce as corresponding variance ($\sigma_v^2$) for each stream.

Figure 7:
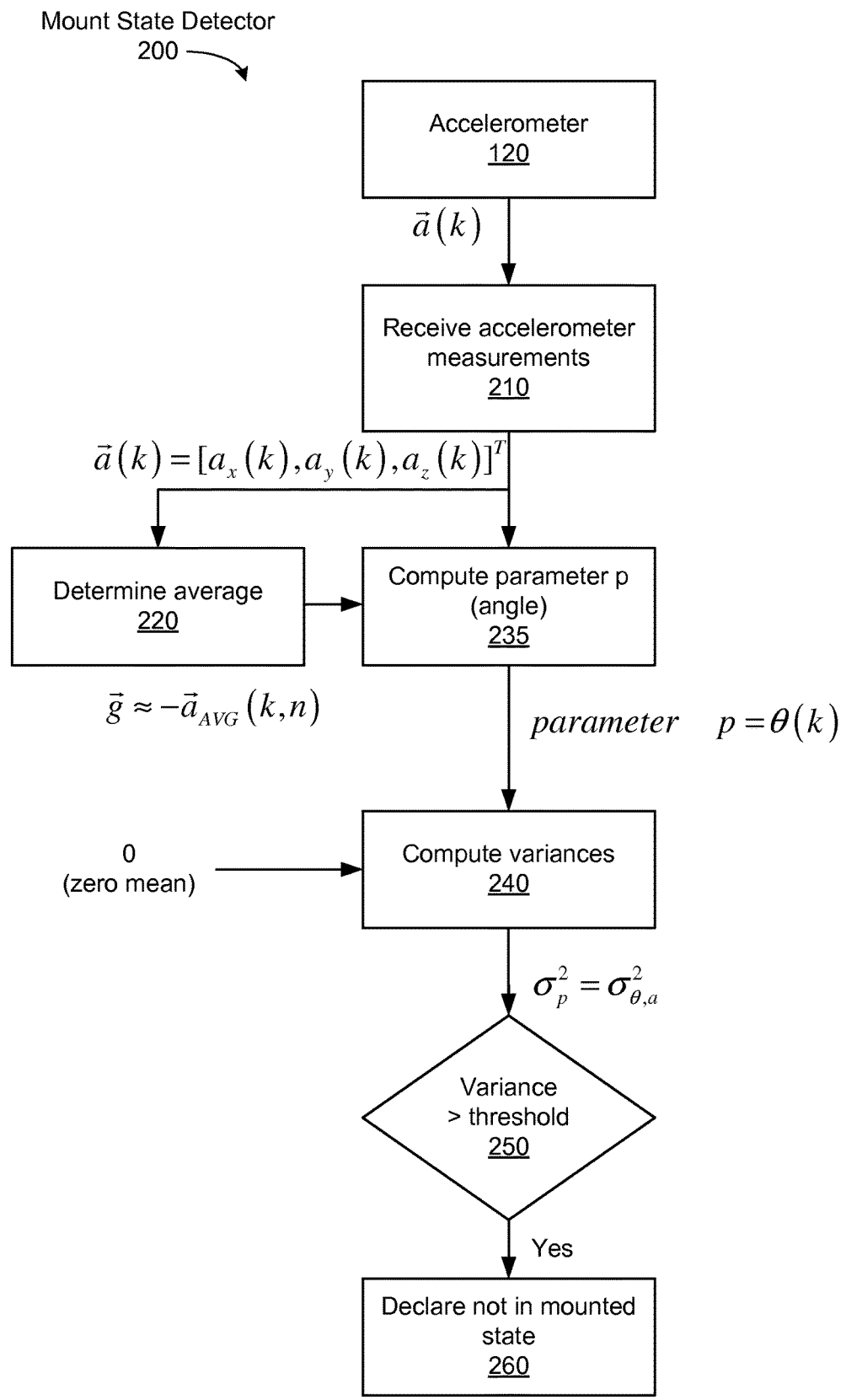
FIGS. 7-10 are block diagrams of other mount state detectors, in accordance with some embodiments of the present invention.

FIGS. 7-10 are block diagrams of other mount state detectors, in accordance with some embodiments of the present invention. In FIG. 7, an angle $\theta(k)$, which represents an approximate instantaneous angle relative to gravity, is used to compute a variance $\sigma_{\angle_a}^2$ (shown as $\sigma_{\theta,a}^2$) of a sequence of angles $\theta(k)$.

An accelerometer 120 provides accelerometer measurements $\vec{a}(k)$ (from a 3-D accelerometer) or $a_x(k)$, $a_y(k)$, and/or $a_z(k)$ (from a 1-D, 2-D or 3-D accelerometer). At step 210, the processor 150 receives the accelerometer measurements $\vec{a}(k)$ from the accelerometer 120 and forwards a vector or one or more scalars for processing to step 220 and step 235. For example, the processor 150 may process one, two or three of the scalar components of the accelerometer measurements $\vec{a}(k)$.

At step 220, the processor 150 computes a running or windowed average $$\left(\text{e.g., } \vec{a}_{AVG}(k, n) = \frac{1}{n}\sum_{i=0}^{n-1}\vec{a}(k-i)\right),$$

which represents a gravity vector $\vec{g}$. At step 235, the processor 150 computes a parameter p, which is an angle θ(k) between the averaged vector represented by the gravity vector $\vec{g}$ and the current accelerometer measurement $\vec{a}(k)$. For example, the angle is computed as:

$$\theta(k) = \arccos\left(\frac{\vec{a}_{AVG}(k,n) \cdot \vec{a}(k)}{\|\vec{a}_{AVG}(k,n)\| \cdot \|\vec{a}(k)\|}\right).$$

Step 235 presents angle θ(k) to step 240. At step 240 and based on angle θ(k), the processor 150 computes a variance $\sigma_{\angle a}^2$, which represents a variance of the angle formed between the accelerometer measurements $\vec{a}(k)$ and vector $\vec{g}$. At step 250, the processor 150 determines if this variance $\sigma_{\angle a}^2$ is greater than a threshold variance. If so, the mobile device 100 is probably not in a mounting device and at step 260, the processor 150 declares that the mobile device 100 is not in a mounted state.

Figure 8:
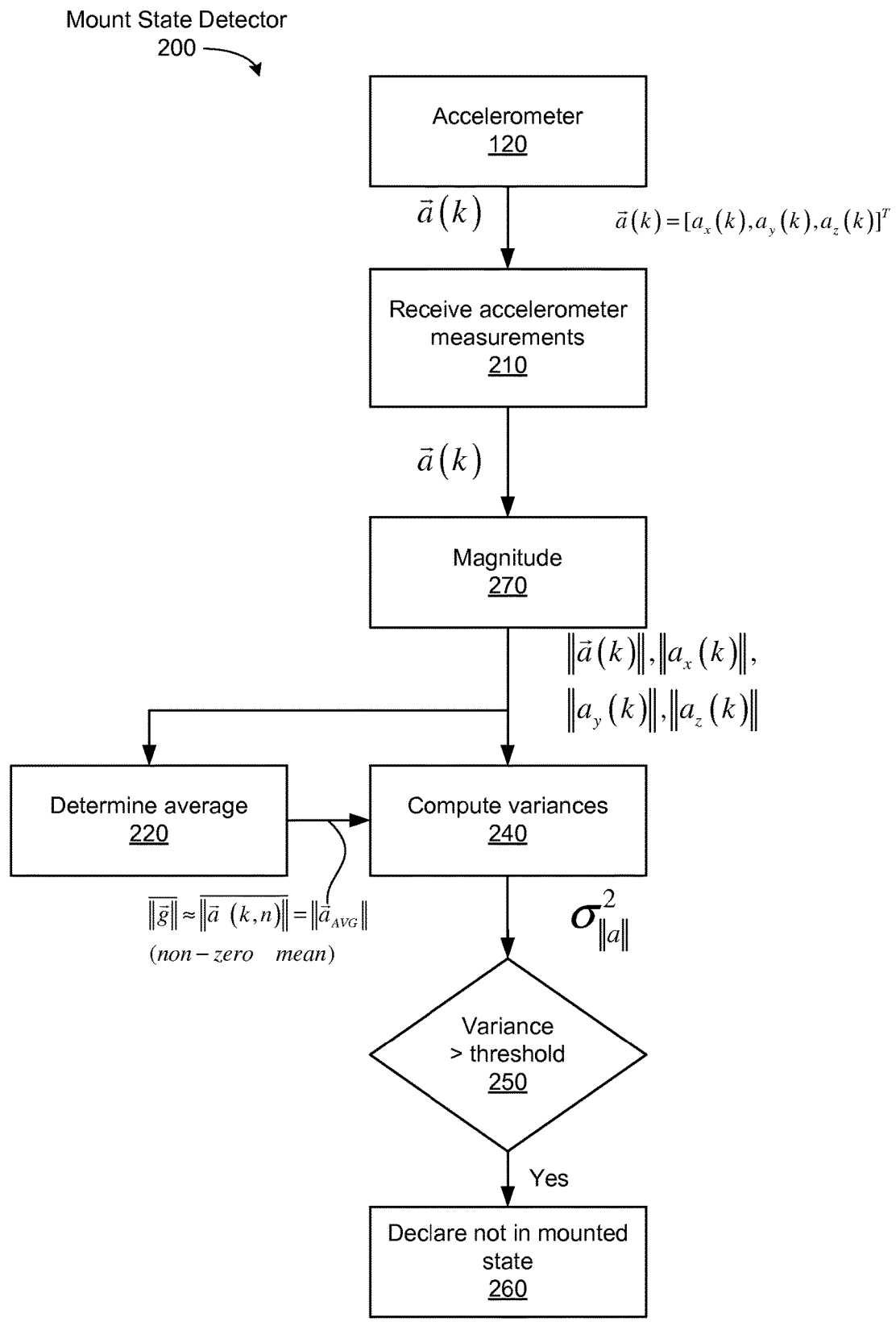

In FIG. 8, an instantaneous magnitude (e.g., $\|\vec{a}(k)\|$ or $\|\vec{a}_y(k)\|$) is compared to a magnitude of an approximation of the gravity to form a variance $\sigma_{\|a\|}^2$. First, the accelerometer 120 provides accelerometer measurements $\vec{a}(k)$ (from a 3-D accelerometer) or $a_x(k)$, $a_y(k)$ and/or $a_z(k)$ (from a 1-D, 2-D or 3-D accelerometer). Next at step 210, the processor 150 receives the accelerometer measurements $\vec{a}(k)$ and forwards a vector or one or more scalars for processing to step 270.

At step 270, the processor 150 determines a magnitude $\|\vec{g}\|$ of the gravity vector $\vec{g}$, and determines a magnitude $\|\vec{a}(k)\|$ the passed along accelerometer measurement $\vec{a}(k)$ then passes the magnitude results to step 220 and step 240.

At step 220, the processor 150 determines an average $$\left(\text{e.g., } \vec{a}_{AVG}(k, n) = \frac{1}{n}\sum_{i=0}^{n-1}\|\vec{a}(k-i)\|\right),$$

which represents a magnitude of the gravity vector $\vec{g}$. At step 240, the processor 150 computes a variance $\sigma_{\|a\|}^2$ based on the magnitude $\|\vec{a}(k)\|$ and the magnitude $\|\vec{g}\|$. The resulting variance $\sigma_{\|a\|}^2$ represents a variance of the magnitude formed between the accelerometer measurements $\vec{a}(k)$ and gravity vector $\vec{g}$.

At step 250, the processor 150 determines if this variance $\sigma_{\|a\|}^2$ is greater than a threshold variance. If so, the mobile device 100 is probably not in a mounting device, and at step 260, the processor 150 declares that mobile device 100 is not in a mounted state.

Figure 9:
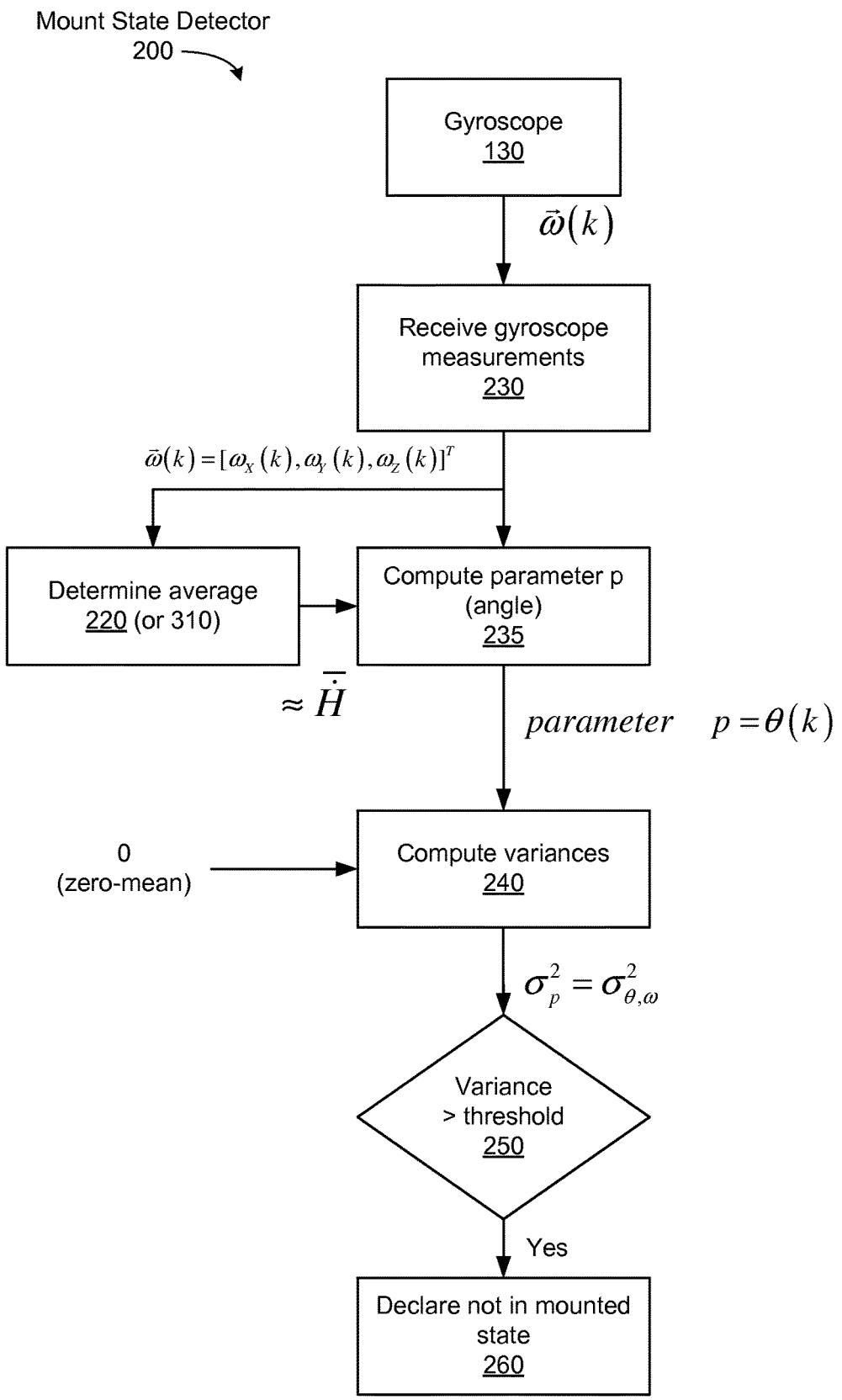

In FIG. 9, an angle θ(k) is shown, which represents an approximate instantaneous angle relative to a vehicle's rotation, is used to compute a variance of $\sigma_{\angle a}^2$ of a sequence of angles θ(k). The gyroscope 130 provides gyroscope measurements $\vec{\omega}(k)$ (from a 3-D gyroscope) or $\omega_x(k)$, $\omega_y(k)$ and/or $\omega_z(k)$ (from a 1-D, 2-D or 3-D gyroscope) to step 230. At step 230, the processor 150 receives the gyroscope measurements $\vec{\omega}(k)$ and forwards a vector or one or more scalars for processing. For example, the processor 150 may only collect one or two of the scalar components of the gyroscope measurements $\vec{\omega}(k)$.

At step 220, the processor 150 computes a running or windowed average $$\left(\text{e.g., } \vec{\omega}_{AVG}(k, n) = \frac{1}{n}\sum_{i=0}^{n-1}\vec{\omega}(k-i)\right),$$

which represents a turn rate or heading rate $\overline{H}$ of a vehicle. Alternatively, the method at step 310 (FIG. 14) described below may be used to form a heading rate $\overline{H}$. At step 235, the processor 150 computes a parameter p, which is an angle θ(k) between the averaged vector (e.g., heading rate $\overline{H}$) from step 220 and the current gyroscope measurement $\overline{\omega}(k)$ from step 230. For example:

$$\theta(k) = \arccos\left(\frac{\vec{\omega}_{AVG}(k,n) \cdot \vec{\omega}(k)}{\|\vec{\omega}_{AVG}(k,n)\| \cdot \|\vec{\omega}(k)\|}\right).$$

Based on the angle θ(k), at step 240, the processor 150 computes a variance $\sigma_{\angle a}^2$, which represents a variance of the angle formed between the gyroscope measurements $\vec{\omega}(k)$ and vehicle's heading rate $\overline{H}$. At step 250, the processor 150 determines if this variance $\sigma_{\angle a}^2$ is greater than a threshold variance. If so, the mobile device 100 is probably not in a mounting device and at step 260, the processor 150 declares that the mobile device 100 is not in a mounted state.

Figure 10:
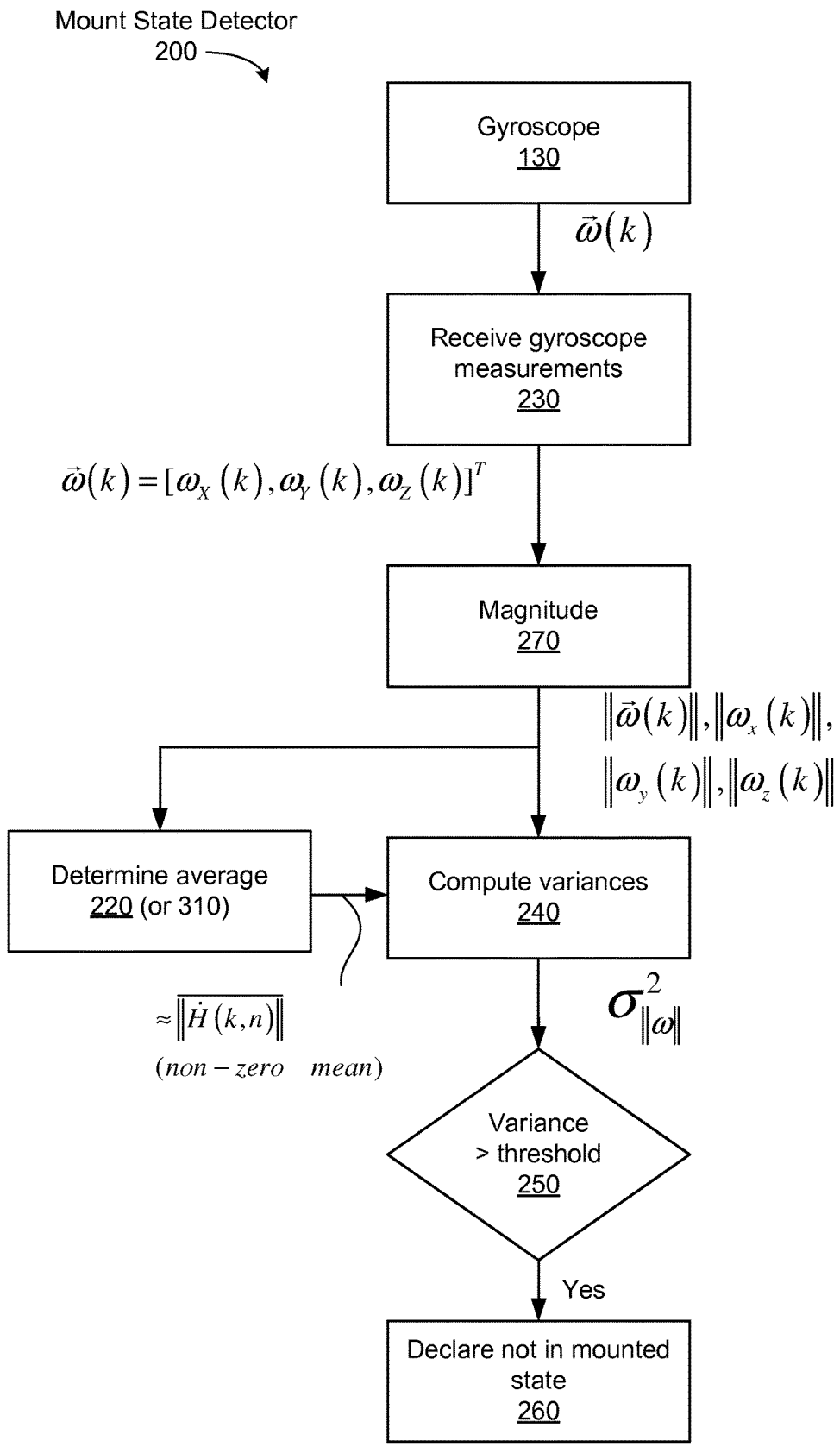

In FIG. 10, an instantaneous magnitude (e.g., $\|\vec{\omega}(k)\|$) is compared to a magnitude of an approximation of the vehicle's turn rate to form a variance $\sigma_{\|\omega\|}^2$. First, the gyroscope 130 provides gyroscope measurements $\vec{\omega}(k)$ (from a 3-D gyroscope) or $\omega_x(k)$, $\omega_y(k)$ or $\omega_z(k)$ (from a 1-D, 2-D or 3-D gyroscope) to step 230. At step 230, the processor 150 receives the gyroscope measurements $\vec{\omega}(k)$ and forwards a vector or one or more scalars for processing.

At step 270, the processor 150 determines a magnitude of the rotation vector $\|\vec{\omega}(k)\|$ from the passed along gyroscope measurement $\vec{\omega}(k)$ then passes the results to step 220 and step 240.

As described above, at step 220, the processor 150 determines an average $$\left(\text{e.g., } \vec{\omega}_{AVG}(k, n) = \frac{1}{n}\sum_{i=0}^{n-1}\vec{\omega}(k-i)\right),$$

which represents a heading rate $\overline{H}$. Also at step 270, the processor 150 determines a magnitude $\|\overline{H}\|$ of the heading rate vector.

At step 240, the processor 150 computes a variance $\sigma_{\mu\omega}^2$, which represents a variance of the magnitude formed between the gyroscope measurements $\vec{\omega}(k)$ and the heading rate $\overline{H}$ of the vehicle.

At step 250, the processor 150 determines if this variance $\sigma_{\|\omega\|}^2$ is greater than a threshold variance. If so, the mobile device 100 is probably not in a mounting device and at step 260, the processor 150 declares that mobile device 100 is not in a mounted state.

Figure 11:
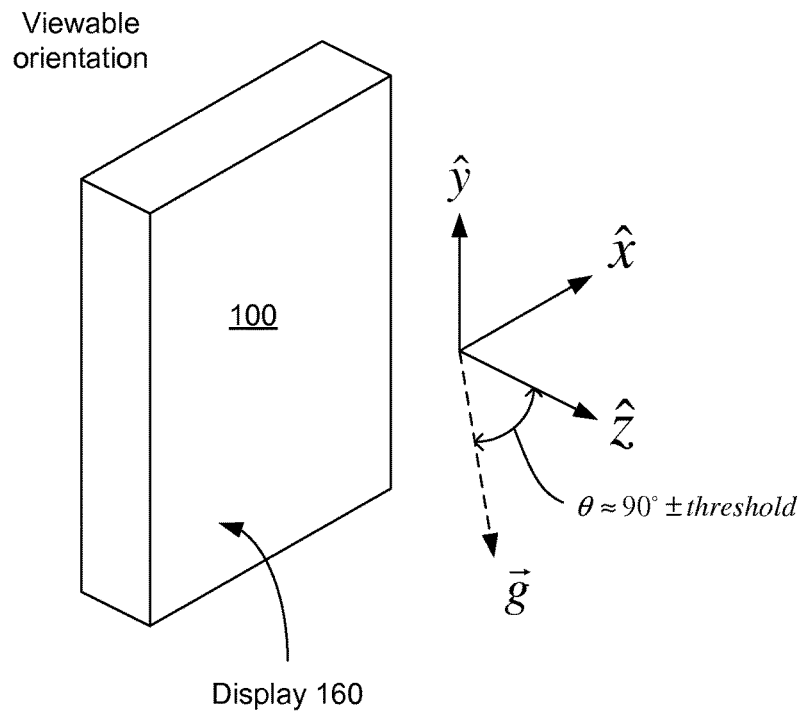
FIGS. 11 and 12 show two orientations of a mobile device 100.
Figure 12:
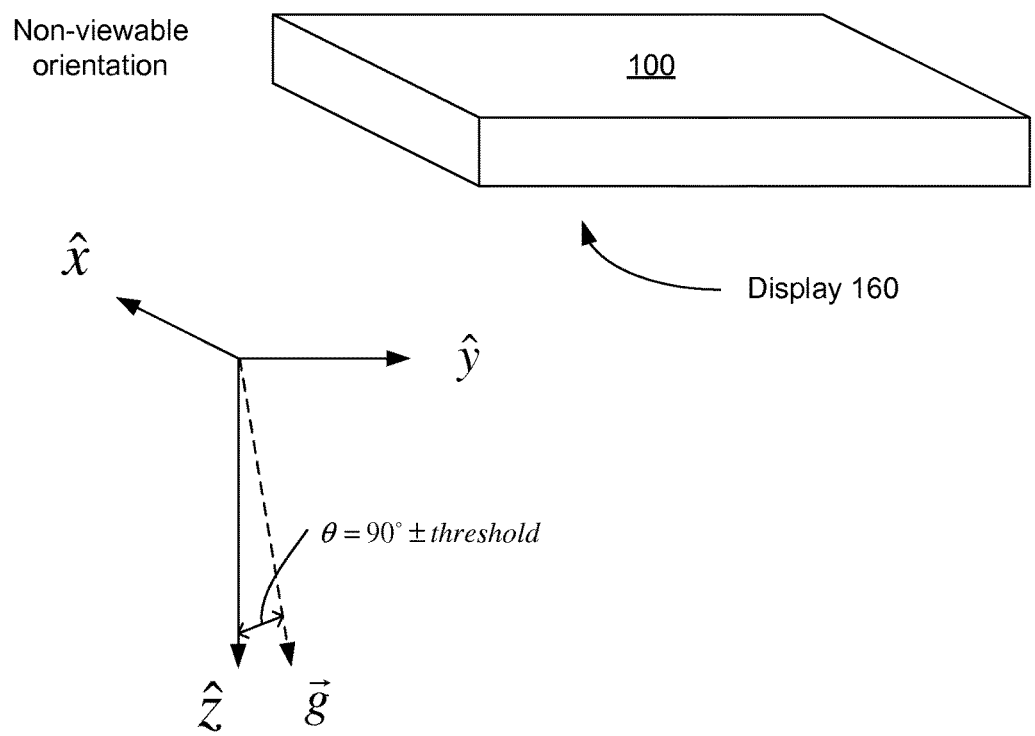

FIGS. 11 and 12 show two orientations of a mobile device 100. The mobile device 100 in a first orientation is probably viewable (thus, possibly in a mounting apparatus) and in a second orientation is probably non-viewable (thus, probably not in a mounting apparatus).

In FIG. 11, a mobile device 100 is shown in a relatively upright position (e.g., an orientation of the mobile device 100 while it is mounted). A body reference system is shown where a Z-axis ($\hat{z}$) protrudes perpendicular to the display 160, an X-axis ($\hat{x}$) points to the left of the mobile device 100, and a Y-axis ($\hat{y}$) points up.

Also shown is a gravity axis ($\vec{g}$), which is relatively perpendicular (within a threshold angle) to the Z-axis ($\hat{z}$). If the angle θ is perpendicular to and within a threshold of the Z-axis ($\hat{z}$), then the mobile device 100 is probably standing upright (as shown) or is standing horizontally (with its face horizontal). Thus, a processor 150 may declare the mobile device 100 is in a mounted state when the gravity axis ($\vec{g}$) is relatively perpendicular (within a threshold angle) to the Z-axis ($\hat{z}$).

In FIG. 12, a mobile device 100 is shown in a relatively flat position (e.g., an orientation of the mobile device 100 while it is on a car seat). In this case, the gravity axis ($\vec{g}$) is relatively parallel (within a threshold angle) to the Z-axis ($\hat{z}$). If the angle θ is parallel, within a threshold, to the Z-axis ($\hat{z}$), then the mobile device 100 is probably lying flat. Thus, a processor 150 may declare the mobile device 100 is in a non-mounted state.

Figure 13:
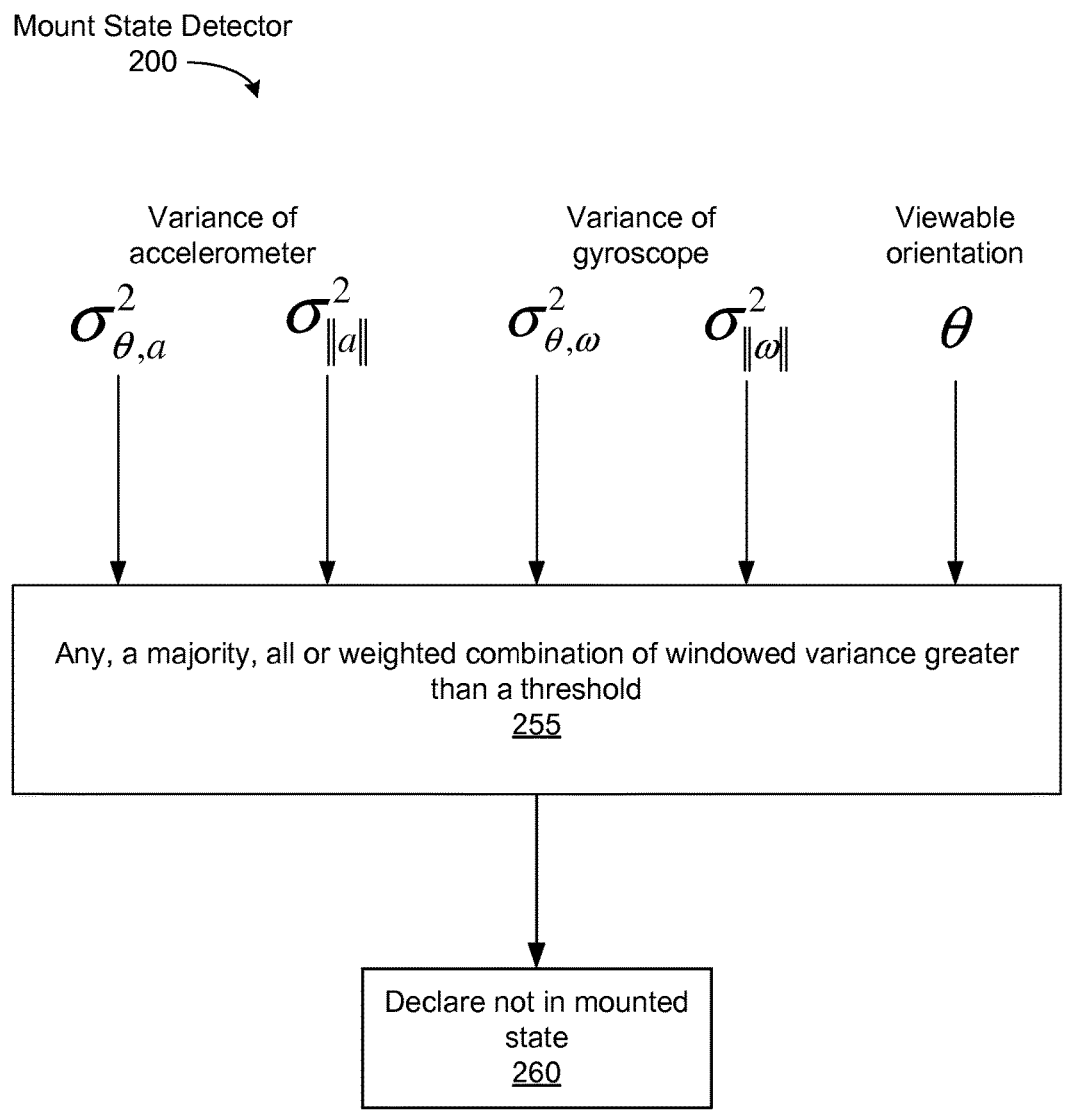
FIG. 13 shows a mount state detector, in accordance with some embodiments of the present invention.

FIG. 13 shows a mount state detector 200, in accordance with some embodiments of the present invention. The mount state detector may accept two or more input values from the variance $\sigma_{\angle a}^2$ (from FIG. 7 and shown as $\sigma_{\theta,a}^2$), the 200 variance $\sigma_{\|a\|}^2$ (from FIG. 8), the variance $\sigma_{\angle a}^2$ (from FIG. 9 and shown as $\sigma_{\theta,\omega}^2$) the variance $\sigma_{\|\omega\|}^2$ (from FIG. 10), and the viewable orientation θ (from FIGS. 11 and 12).

At step 255, the processor 150 declares if the mobile device 100 is not in a mounted state. The processor 150 may declare the mobile is not in a mounted state if: (1) any one of the two or more input values declares the mobile device 100 is not in a mounted state; (2) a majority of the two or more input values declares the mobile device 100 is not in a mounted state; (3) all of the two or more input values declares the mobile device 100 is not in a mounted state; (4) a weighted combination of decisions from the two or more input values (e.g., based on detection accuracy) is greater than a threshold (e.g., 0.5); or (5) a weighted combination of the raw input values (e.g., based on detection accuracy) is greater than a threshold (e.g., 0.5).

Figure 14:
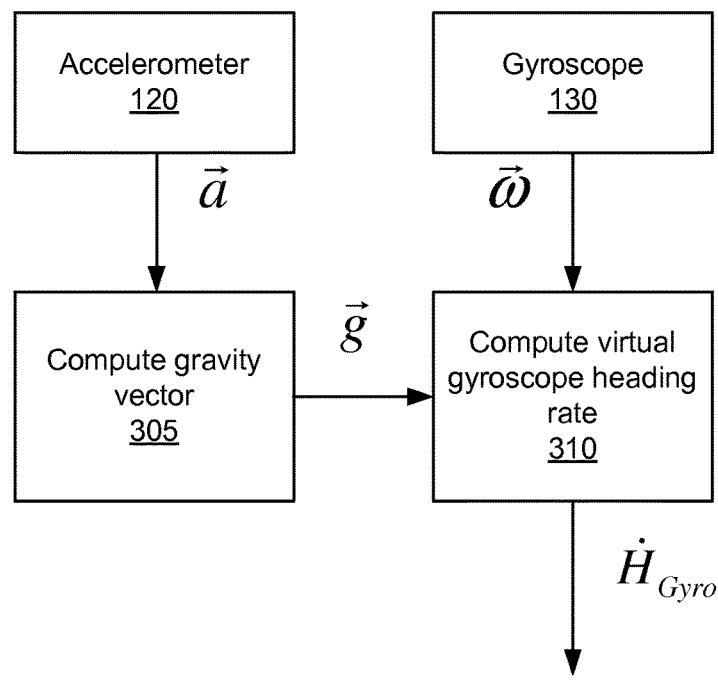
FIGS. 14 and 15 show block diagrams of units to compute an improved heading, in accordance with some embodiments of the present invention.
Figure 15:
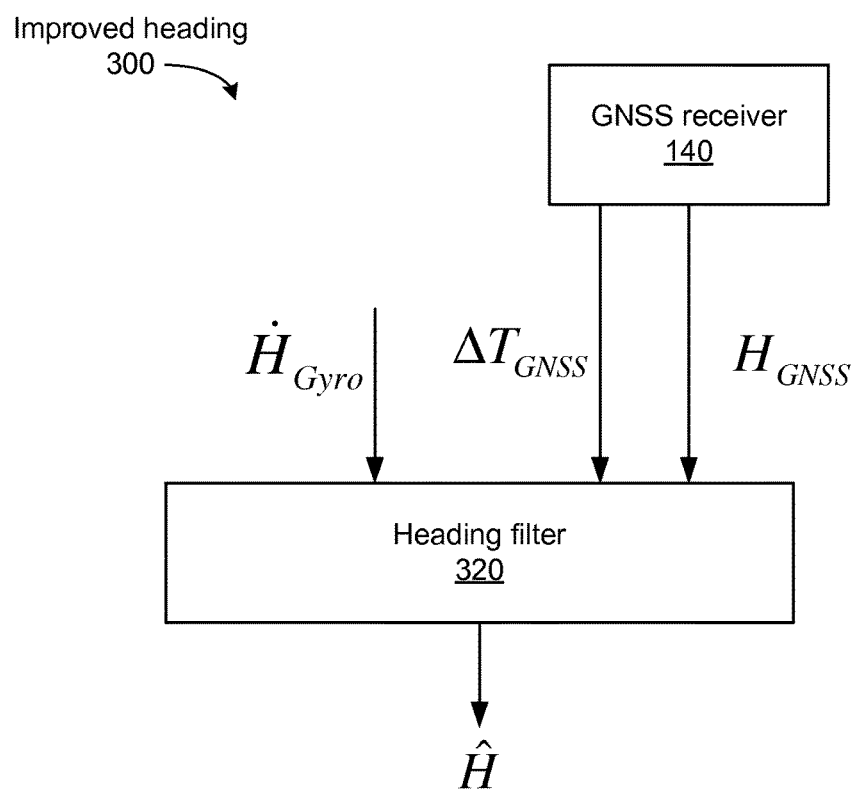

FIGS. 14 and 15 show block diagrams of units to compute an improved heading, in accordance with some embodiments of the present invention.

In FIG. 14, the process provides a heading rate based on the accelerometer 123 and the gyroscope 130. As described above, the accelerometer 120 produces acceleration measurements ($\vec{a}$) and the gyroscope 130 produces angular rate measurements ($\vec{\omega}$).

At step 305, the processor 150 computes a gravity vector ($\vec{g}$) based on a low pass filter of accelerometer measurements ($\vec{a}$). If the mobile device 100 is fixed in a mount and the car 10 is either stationary or moving at a constant velocity, the gravity vector stays constant or settles in on a constant value.

At step 310, the processor 150 computes a virtual gyroscope heading rate ($\dot{H}_{Gyro}$), which is based on the gravity vector ($\vec{g}$) and the angular rate measurements ($\vec{\omega}$) from the gyroscope 130. The virtual gyroscope heading rate ($\dot{H}_{Gyro}$) is described in additional detail with reference to FIG. 16.

In FIG. 15, the process 300 combines various headings to compute the improved heading ($\hat{H}$). As described above, the processor 150 produces a virtual gyroscope heading rate ($\dot{H}_{Gyro}$) using measurements from the accelerometer 120 and the gyroscope 130. The GNSS receiver 140 produces a GNSS heading ($H_{GNSS}$) and a time $\Delta T_{GNSS}$ between GNSS headings.

At step 320, a heading filter takes as input variables both the GNSS heading ($H_{GNSS}$) and the virtual gyroscope heading rate ($\dot{H}_{GNSS}$) to compute an improved heading ($\hat{H}$). Step 320 is described below with reference to FIG. 17 in further detail.

Figure 16:
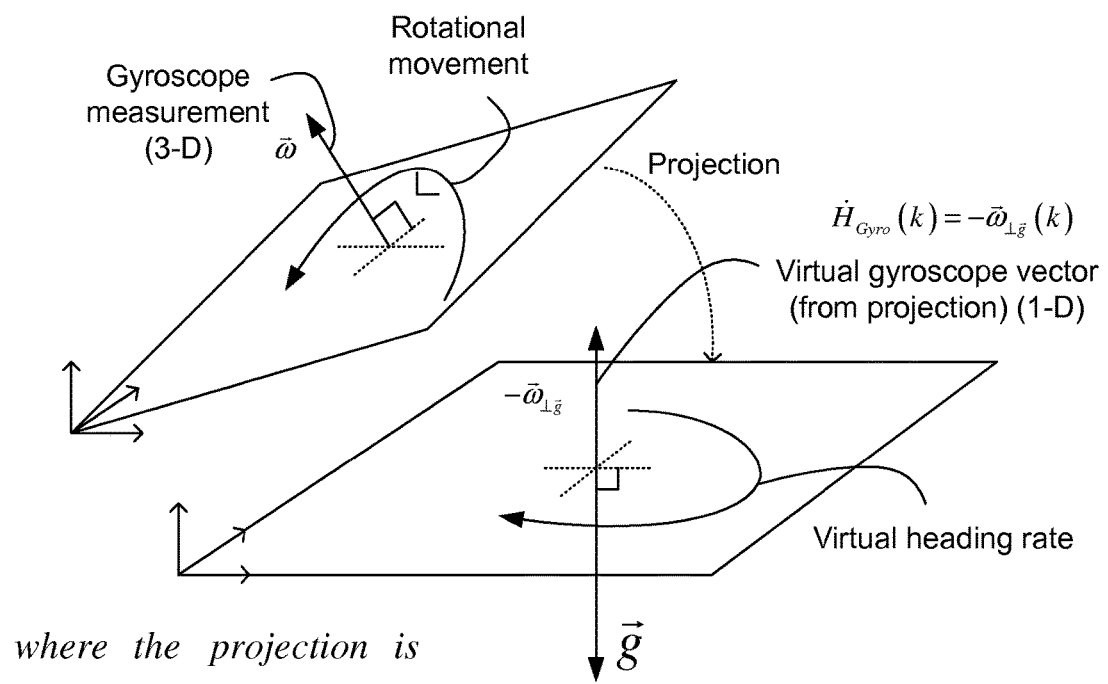
FIG. 16 illustrates a projection used in a virtual gyroscope, in accordance with some embodiments of the present invention.

FIG. 16 illustrates a projection used in a virtual gyroscope, in accordance with some embodiments of the present invention. At step 310 described above with reference to FIG. 14, the processor 150 converts the raw three-dimensional gyroscope measurements ($\vec{\omega}$) to a one-dimensional virtual gyroscope heading rate ($\dot{H}_{Gyro}$), which is parallel to the gravity vector ($\vec{g}$) and represents a rate of change in yaw in the horizontal plane. The processor 150 computes the virtual gyroscope heading rate ($\dot{H}_{Gyro}$) by projecting the gyroscope measurements ($\vec{\omega}$) onto the gravity vector. In other words, $\dot{H}_{Gyro} = -\vec{\omega}_{\perp\vec{g}}(k)$ where θ defines the angle between the two vectors ($\vec{\omega}, \vec{g}$).

The figure shows a gyroscope measurement ($\vec{\omega}$) defining a first plane perpendicular to the gyroscope measurement ($\vec{\omega}$). The figure also shows a gravity vector ($\vec{g}$) defining a second plane perpendicular to the gravity vector ($\vec{g}$). The gravity vector ($\vec{g}$) is derived from the accelerometer measurements ($\vec{\omega}$). The projection of the gyroscope measurement ($\vec{\omega}$) onto the gravity vector ($\vec{g}$) results in the virtual gyroscope heading rate ($\dot{H}_{Gyro}$) shown perpendicular to the second plane. The projection is defined as $$\dot{H}_{Gyro} = -\vec{\omega}_{\perp\vec{g}}(k) = -\frac{\vec{g}\cdot\vec{\omega}}{\|\vec{g}\|}\cdot\frac{\vec{g}}{\|\vec{g}\|} = -\|\vec{\omega}\|\cos(\theta)\frac{\vec{g}}{\|\vec{g}\|}.$$

Figure 17:
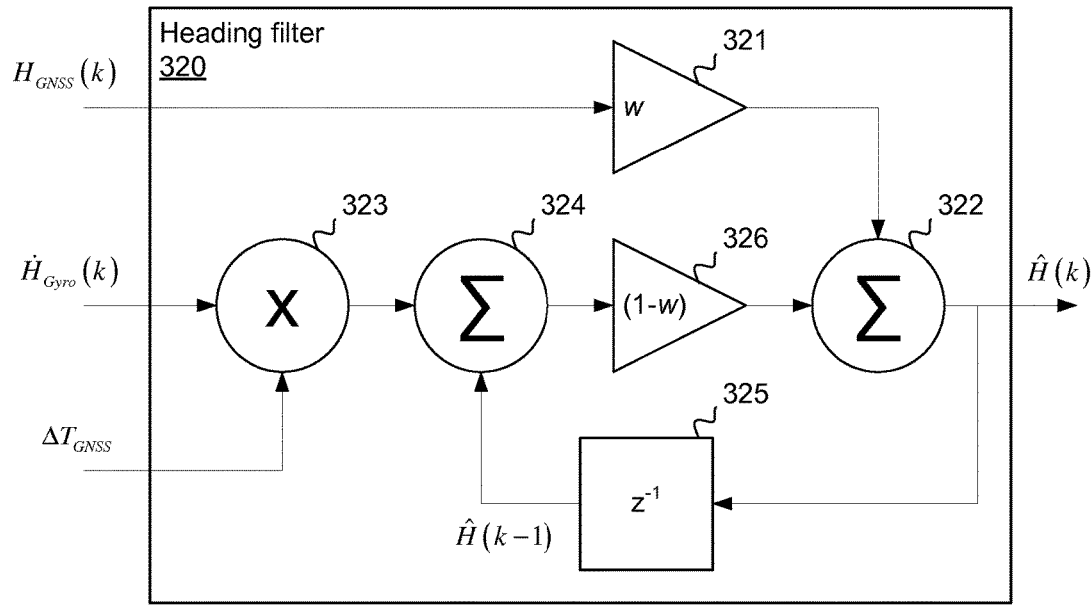
FIG. 17 is a block diagram of a heading filter, in accordance with some embodiments of the present invention.

FIG. 17 is a block diagram of a heading filter, in accordance with some embodiments of the present invention. The heading filter 320, first described with reference to FIG. 15, receives the GNSS heading ($H_{GNSS}(k)$) and the virtual gyroscope heading rate ($\dot{H}_{Gyro}(k)$), processes and combines these two values, and then produces an improved heading ($\hat{H}(k)$). The improved heading ($\hat{H}(k)$) is formed by a weighted combination of headings derived from the GNSS receiver 140 and the gyroscope 130 as shown in FIGS. 14 and 15.

Mathematically, the improved heading ($\hat{H}(k)$) may be represented by the formula:

$$\hat{H}(k) = w\cdot H_{GNSS}(k) + (1-w)[\hat{H}(k-1) + \Delta T_{GNSS}\cdot\dot{H}_{Gyro}(k)]$$

where the weighting w may be represented by:

$$w = \frac{\left(\sigma_{\hat{H}(k)}^2 + \Delta T_{GNSS}^2 \cdot \sigma_{\dot{H}_{Gyro}(k)}^2\right)}{\left(\sigma_{H_{GNSS}(k)}^2 + \sigma_{\hat{H}(k)}^2 + \Delta T_{GNSS}^2 \cdot \sigma_{\dot{H}_{Gyro}(k)}^2\right)}$$

where $\sigma_{\hat{H}(k)}^2$ is the variance of the improved heading ($\hat{H}(k)$), where $\sigma_{\dot{H}_{Gyro}(k)}^2$ is the variance of the virtual gyroscope heading rate ($\dot{H}_{Gyro}$ (k)) from step 310 derived from measurements from the gyroscope 130, where $\sigma_{H_{GNSS}(k)}^2$ is the variance of the GNSS heading ($H_{GNSS}(k)$), and where $\Delta T_{GNSS}$ is the time separation between heading values from the GNSS receiver 140.

The heading filter 320 comprises a first amplifier 321 that weights the GNSS heading ($H_{GNSS}(k)$) by a weighing value (w) and feeds this first weighted heading w·$H_{GNSS}(k)$) to a first input of a first summer 322, which produces the improved heading ($\hat{H}(k)$). A second input of the first summer 322 is provided by a chain that begins with scaling the virtual heading rate ($\dot{H}_{Gyro}(k)$) by the time ($\Delta T_{GNSS}$, which represents a time between heading samples) with product operator 323. The product is feds to a second summer 324 that is also fed by a delayed version ($\hat{H}(k-1)$) of the improved heading ($\hat{H}(k)$) from delay unit 325 labeled with $z^{-1}$. The resulting sum is weighted by a second amplifier 326 by a weighing value (1-w), which feeds the second input of the first summer 322. Typically, both weighting values (w and 1-w) range somewhere between zero and one and sum to one.

Figure 18:
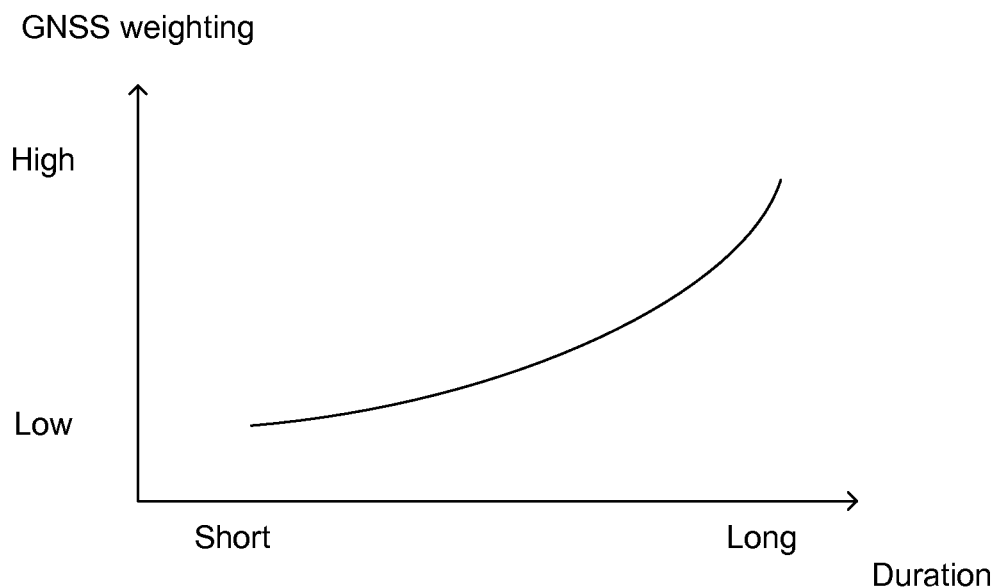
FIGS. 18 and 19 show a relationship between a weighting factor and a duration of integration.
Figure 19:
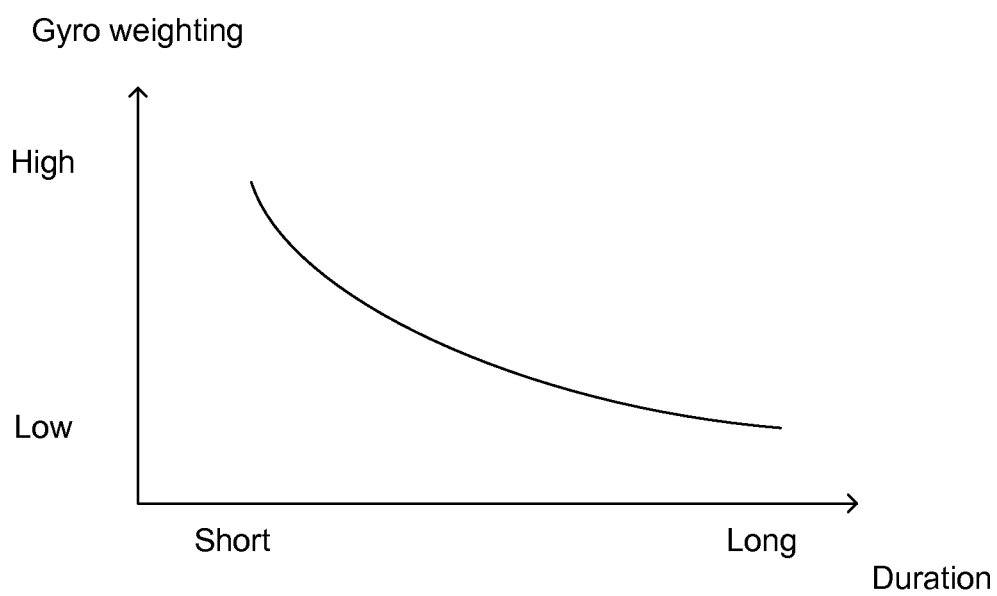

FIGS. 18 and 19 show a relationship between a weighting factor and a duration of integration. FIG. 18 shows an expected relationship between an integration time and an expected weighting factor. GNSS-based heading values (e.g., $H_{GNSS}(k)$) taken over a short duration have less certainty (or equivalently, more uncertainty) than GNSS-based heading values taken over a long duration because of long-term trends. Therefore, GNSS-based heading values are typically given a higher weighting if the duration is longer.

In FIG. 19, an example inverse relationship is shown between integration time and an expected weighing factor. Gyro-based heading values (e.g., from $\dot{H}_{Gyro}(k)$) taken over a short duration have more certainty (or equivalently, less uncertainty) than gyro-based heading values taken over a long duration because of accumulated error. Therefore, gyro-based heading values are typically given a higher weighting if the duration is shorter.

Figure 20:
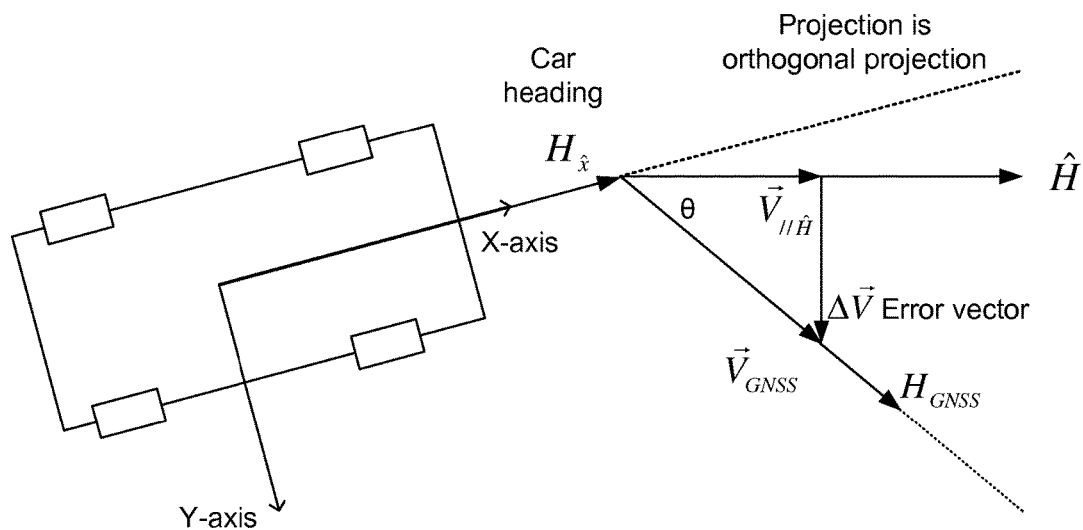
FIGS. 20, 21, 22 and 23 illustrate a method for computing an improved velocity, in accordance with some embodiments of the present invention.

FIGS. 20, 21, 22 and 23 illustrate a method for computing an improved velocity, in accordance with some embodiments of the present invention. In FIG. 20, a top view of a car 10 is shown. The car 10 travels along a first direction indicated as along the X-axis ($\hat{x}$) in the local reference system. The improved heading ($\hat{H}$), which is a function of the GNSS heading ($H_{GNSS}$) and the virtual gyroscope heading rate ($\dot{H}_{Gyro}$), often faces in a direction different than X-axis. The improved velocity ($\vec{V}_{//\hat{H}}$) is parallel to or collinear with the improved heading ($\hat{H}$).

Similarly, the Kalman-filtered GNSS velocity ($\vec{V}_{GNSS}$), is parallel to or collinear with the Kalman-filtered GNSS heading ($\vec{H}_{GNSS}$) and is derived from the GNSS heading ($H_{GNSS}$). The improved velocity ($\vec{V}_{//\hat{H}}$) has a direction component and a magnitude component. The direction of the improved velocity ($\vec{V}_{//\hat{H}}$) may be formed by adopting the direction of the improved heading ($\hat{H}$). The magnitude of the improved velocity ($\vec{V}_{//\hat{H}}$) may be formed from a projection of the Kalman-filtered GNSS velocity ($\vec{V}_{GNSS}$) on the improved heading ($\hat{H}$), thus $$\vec{V}_{//\hat{H}} = \frac{\vec{V}_{GNSS}}{\cos(\theta)} \angle ang(\hat{H})$$

where θ defines the angle formed between $\vec{V}_{GNSS}$ and $\hat{H}$, and $\angle ang(\hat{H})$ is the angular direction of $\hat{H}$.

Figure 21:
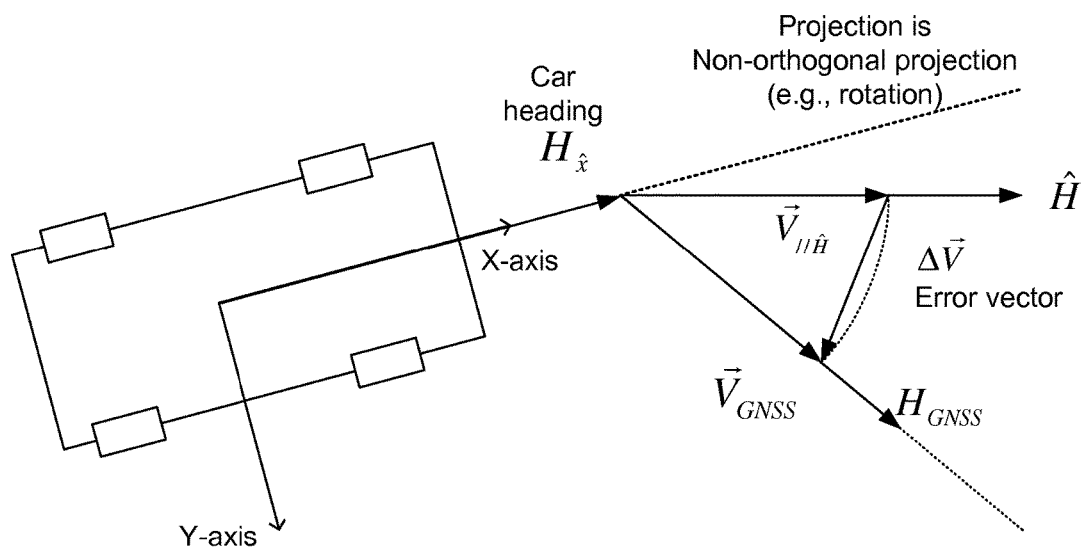

In FIG. 21, another top view of a car 10 is shown similar to that described above and shown in FIG. 20 except the magnitude of the improved velocity ($\vec{V}_{//\hat{H}}$) is calculated in an alternative fashion. As before, the improved velocity ($\vec{V}_{//\hat{H}}$) includes a direction component formed by adopting the direction of the improved heading ($\hat{H}$). In this alternative embodiment, the magnitude of the improved velocity ($\vec{V}_{//\hat{H}}$) may be formed by keeping the magnitude of the Kalman-filtered GNSS velocity ($\vec{V}_{GNSS}$), thus $\vec{V}_{//\hat{H}} = \|\vec{V}_{GNSS}\| \angle ang(\hat{H})$ where $\|\vec{V}_{GNSS}\|$ the magnitude of $\vec{V}_{GNSS}$.

In comparing the methods of FIGS. 20 and 21, the former forms the improved velocity ($\vec{V}_{//\hat{H}}$) using a formal mathematical projection on the improved heading ($\hat{H}$), whereas the latter forms the improved velocity ($\vec{V}_{//\hat{H}}$) by an informal projection (rotation) on the improved heading ($\hat{H}$). Both of these methods are presented as projecting the Kalman-filtered GNSS velocity ($\vec{V}_{GNSS}$) on the improved heading ($\hat{H}$). The methods described above utilized the Kalman-filtered GNSS velocity ($\vec{V}_{GNSS}$). Alternative methods use a velocity ($\vec{V}_{GNSS\text{-}based}$) based on the GNSS heading ($\vec{H}_{GNSS}$), where the Kalman-filtered GNSS velocity ($\vec{V}_{GNSS}$) is an example of the GNSS based velocity ($\vec{V}_{GNSS\text{-}based}$).

The difference between the improved velocity ($\vec{V}_{//\hat{H}}$) and the Kalman filtered GNSS velocity ($\vec{V}_{GNSS}$) (or generally, the GNSS based velocity ($\vec{V}_{GNSS\text{-}based}$)) forms a velocity error ($\Delta \vec{V}$), which is fed back to the Kalman filter 410 as a correction signal. In this manner, the velocity error ($\Delta \vec{V}$) is used by the Kalman filter 410 to improve future velocity estimates as described below.

Figure 22:
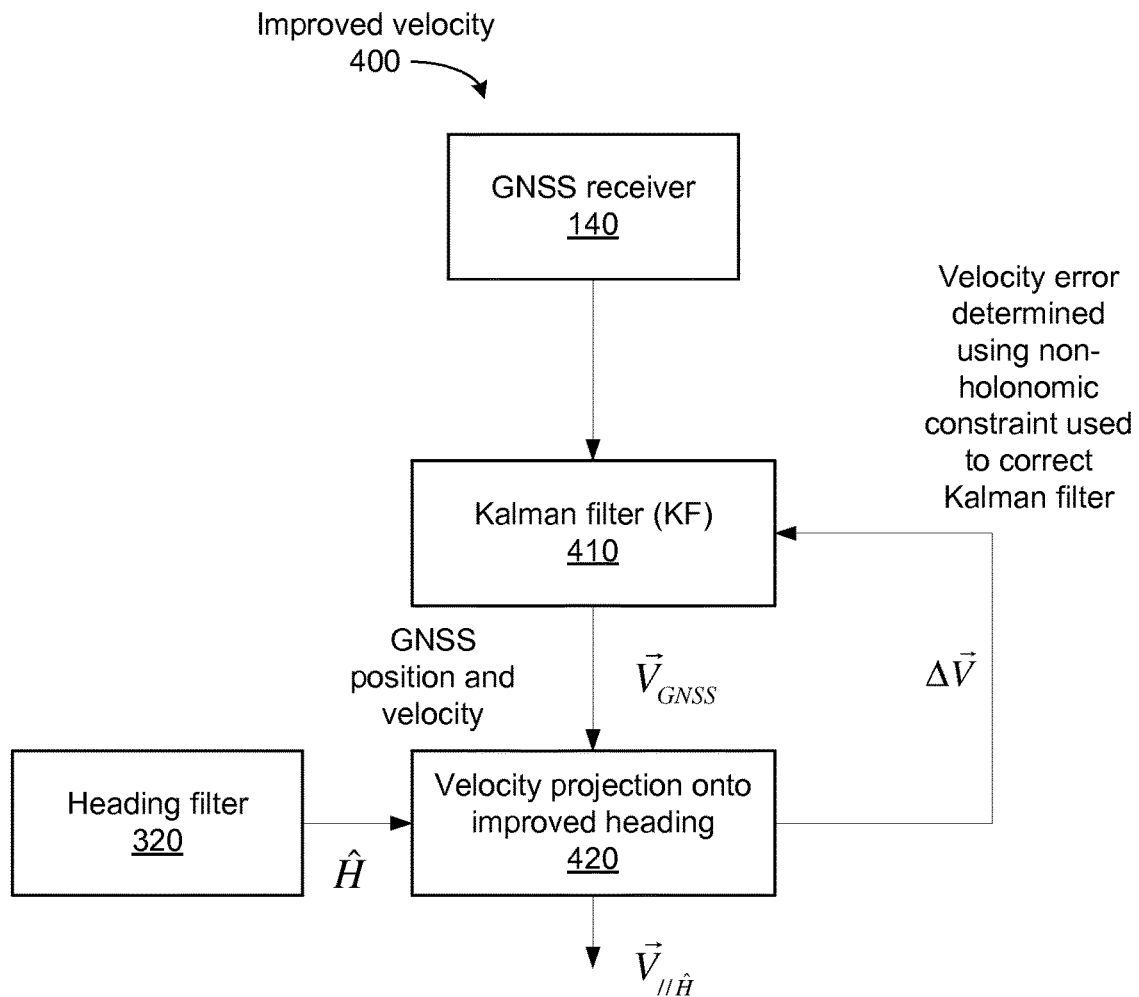

In FIG. 22, the block diagram shows steps a processor 150 executes to generate an improved velocity ($\vec{V}_{//\hat{H}}$) and a velocity error ($\Delta \vec{V}$). At step 410, the processor 150 receives a GNSS velocity ($\vec{V}_{GNSS}$) from the GNSS receiver 140 and passes the GNSS velocity ($\vec{V}_{GNSS}$) through a Kalman filter to produce a Kalman-filtered GNSS velocity ($\vec{V}_{GNSS}$).

At step 420, the processor 150 projects the Kalman-filtered GNSS velocity ($\vec{V}_{GNSS}$) against the improved heading ($\hat{H}$) to compute an improved velocity ($\vec{V}_{//\hat{H}}$), which is parallel to the improved heading ($\hat{H}$). Step 420 also computes the difference between the Kalman-filtered GNSS velocity ($\vec{V}_{GNSS}$) and the improved velocity vector ($\vec{V}_{//\hat{H}}$) to generate the velocity error ($\Delta \vec{V}$). As described above, the velocity error ($\Delta \vec{V}$) is used by the Kalman filter 410 as a correction value to improve the next Kalman-filtered GNSS velocity ($\vec{V}_{GNSS}$). In essence, the velocity error ($\Delta \vec{V}$) is determined using a non-holonomic constraint and is used to correct Kalman filter.

Figure 23:
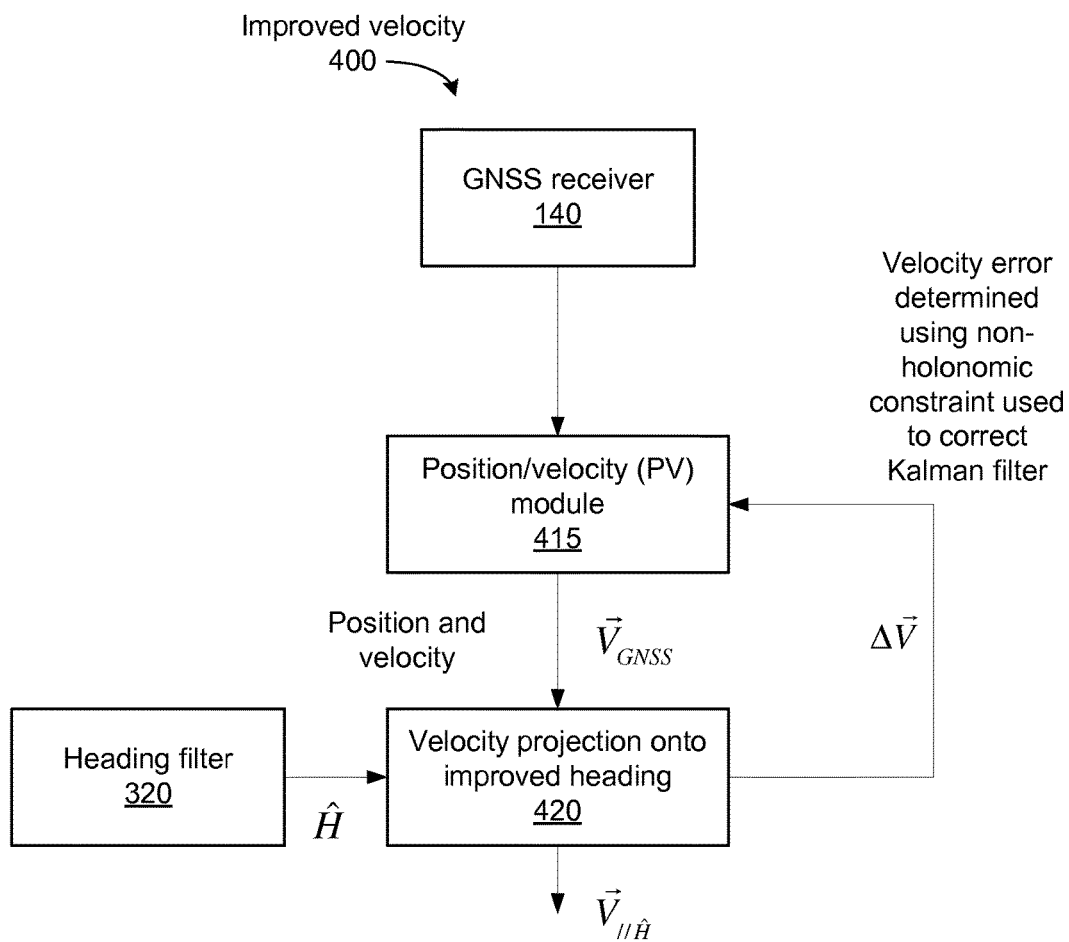

In FIG. 23, the block diagram shows another set of steps a processor 150 executes to generate an improved velocity ($\vec{V}_{//\hat{H}}$) and a velocity error ($\Delta \vec{V}$). At step 415, the processor 150 receives a GNSS velocity ($\vec{V}_{GNSS}$) from the GNSS receiver 140 and passes the GNSS velocity ($\vec{V}_{GNSS}$) through a position/velocity (PV) module to produce a PV filtered GNSS velocity ($\vec{V}_{GNSS}$).

Again, at step 420, the processor 150 projects the PV filtered GNSS velocity ($\vec{V}_{GNSS}$) against the improved heading ($\hat{H}$) to compute an improved velocity ($\vec{V}_{//\hat{H}}$), which is parallel to the improved heading ($\hat{H}$). Again, step 420 computes the difference between the PV filtered GNSS velocity ($\vec{V}_{GNSS}$) and the improved velocity vector ($\vec{V}_{//\hat{H}}$) to generate the velocity error ($\Delta \vec{V}$). The velocity error ($\Delta \vec{V}$) is used by the PV module 415 as a correction value to improve the next PV filtered GNSS velocity ($\vec{V}_{GNSS}$). The velocity error ($\Delta \vec{V}$) is determined using a non-holonomic constraint and is used to correct Kalman filter.

Figure 24:
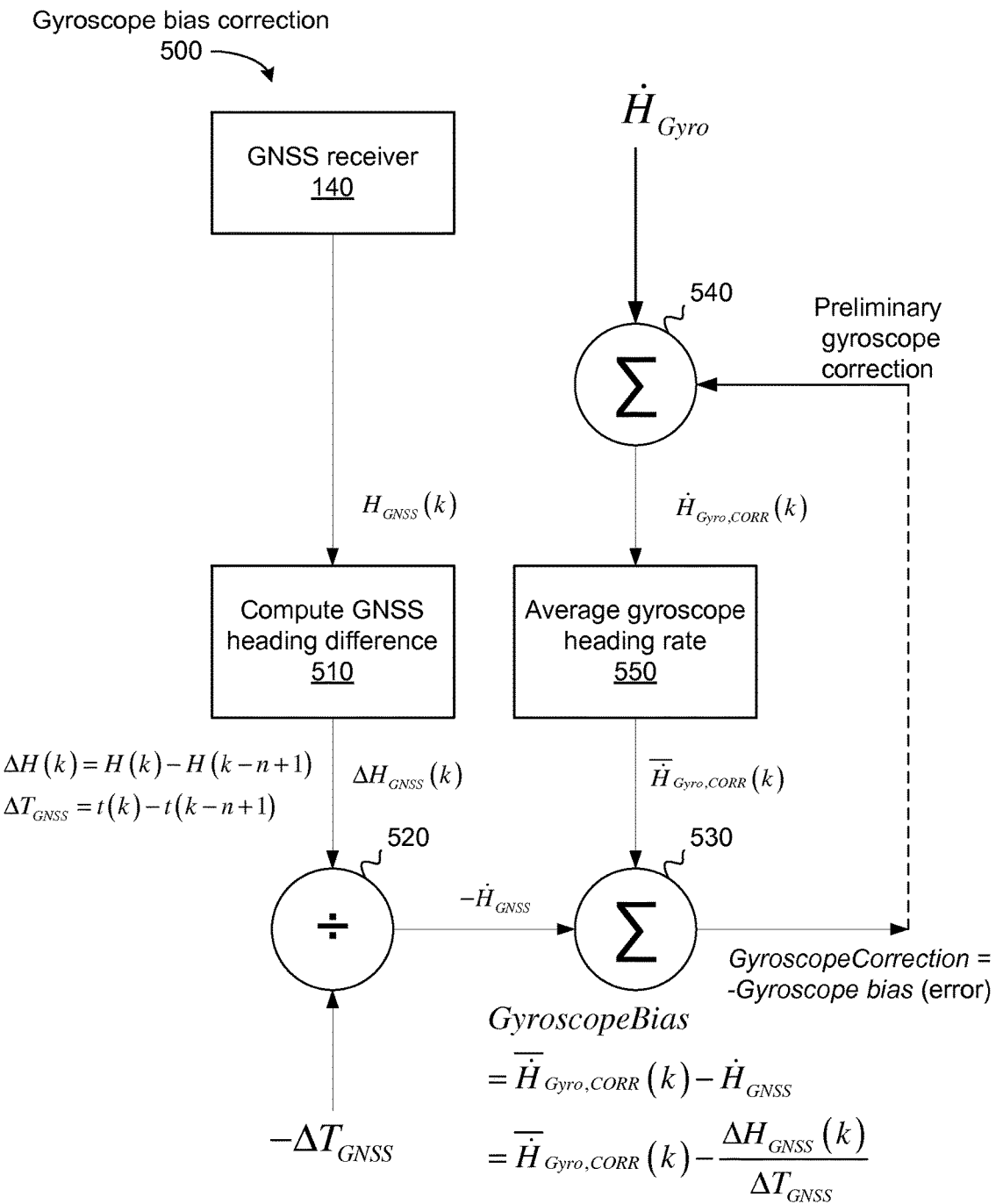
FIG. 24 shows a method for generating a gyroscope bias, in accordance with some embodiments of the present invention.

FIG. 24 shows a method for generating a gyroscope bias, in accordance with some embodiments of the present invention. Mathematically, the gyroscope bias may be represented as:

$$GyroscopeBias = \bar{\dot{H}}_{Gyro,CORR}(k) - \frac{[\Delta H_{GNSS}(k)]}{\Delta T_{GNSS}}$$

where $[\Delta H_{GNSS}(k)] = H_{GNSS}(k) - H_{GNSS}(k-n+1)$ and where $\bar{\dot{H}}_{Gyro,CORR}(k) = \frac{1}{n}\sum_{i=0}^{n-1} \dot{H}_{Gyro}(k-i)$.

At step 510, the processor 150 receives a GNSS heading (H(k)) from the GNSS receiver 140 and computes a GNSS heading change over a window ($[\Delta H_{GNSS}(k)]$). At step 520, the processor 150 converts the GNSS heading change ($\Delta H_{GNSS}$) from a heading to a rate by scaling or dividing by a negative of the GNSS time difference ($-\Delta T_{GNSS}$) to form a GNSS heading rate ($-\bar{\dot{H}}_{GNSS}$), which is fed as a first input to a first summer 530. A second input of the first summer 530 is fed an average of the virtual gyroscope heading rate ($\bar{\dot{H}}_{Gyro,CORR}(k)$) and the sum of these two inputs (or equivalently, a differences between the two average rates) forms the gyroscope bias signal (GyroscopeBias).

The processor 150 forms the average gyroscope heading rate ($\bar{\dot{H}}_{Gyro,CORR}(k)$) from a chain beginning at step 310 of FIG. 14, which receives the gyroscopic measurements ($\vec{\omega}$) and computes a virtual gyroscope heading rate ($\dot{H}_{Gyro}$) as described above. The virtual gyroscope heading rate ($\dot{H}_{Gyro}$) is fed to a second summer 540 as a first input. A second input to the second summer 540 may be feedback as a preliminary gyroscope bias, which may be set by the previously determined gyroscope bias, where GryoscopeCorrection=-GryoscopeBias(error). The second summer 540 produces a corrected gyroscope heading rate ($\dot{H}_{Gyro,CORR}(k) = \dot{H}_{Gyro} +$ GyroscopeBias). In step 550, the processor 150 averages the corrected gyroscope heading rate ($\dot{H}_{Gyro,CORR}(k)$) to form the average gyroscope heading rate ($\bar{\dot{H}}_{Gyro,CORR}(k)$) in the average gyroscope heading rate module. A new gyroscope bias may be computed at each iteration k or after a predetermined number of iterations.

Figure 25:
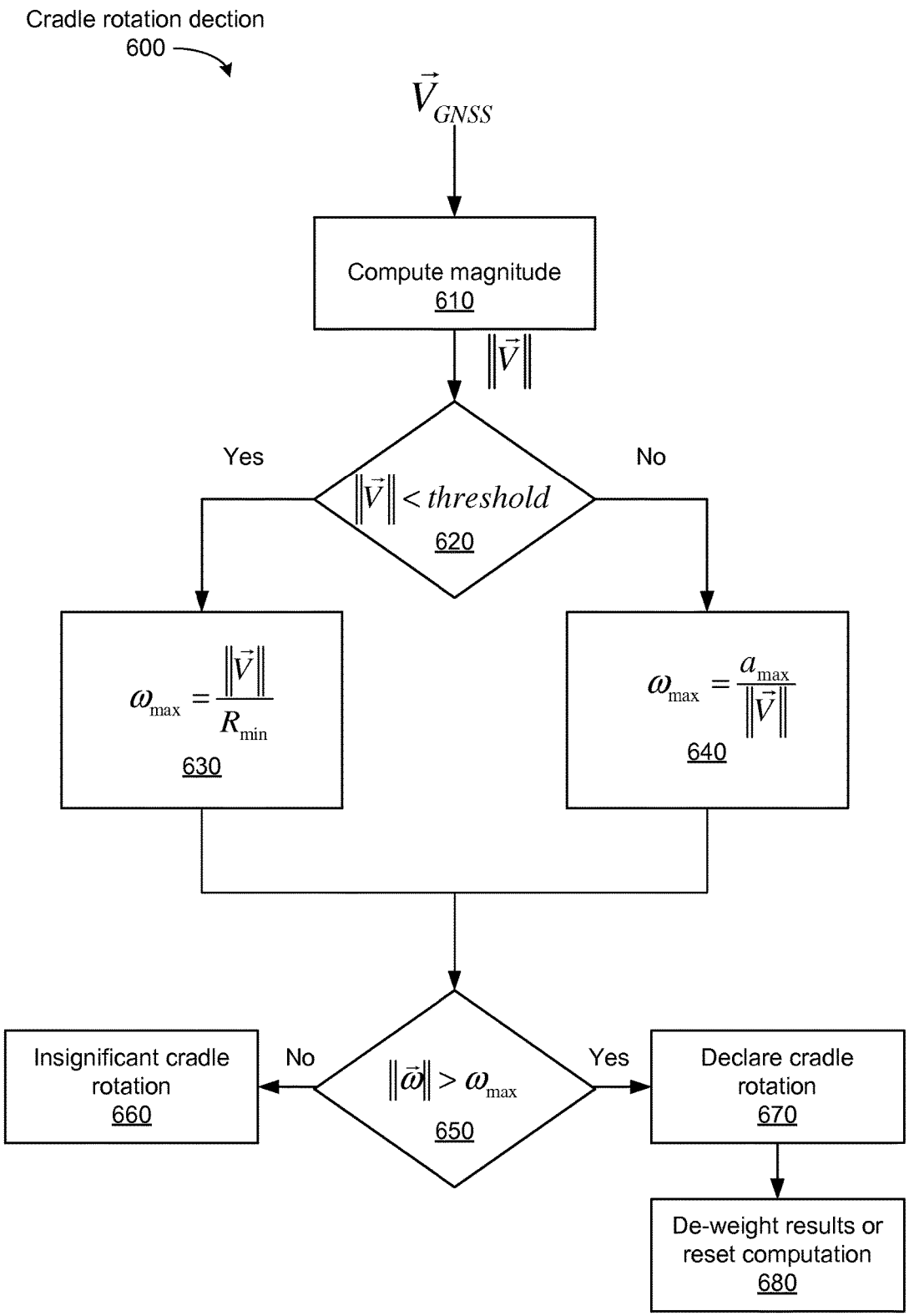
FIG. 25 is a block diagram of a cradle rotation detector, in accordance with some embodiments of the present invention.

FIG. 25 is a block diagram of a cradle rotation detector, in accordance with some embodiments of the present invention. The process 600 begins at step 610 where the processor 150 converts the Kalman-filtered GNSS velocity ($\vec{V}_{GNSS}$) to a magnitude ($\|\vec{V}\|=\|\vec{V}_{GNSS}\|$).

At step 620, the processor 150 compares the magnitude ($\|\vec{V}\|$) to a velocity threshold to show if the mobile device 100 is relatively still in its cradle or being rotated within the cradle by the user. Depending on the level of relative movement, a second threshold ($\omega_{max}$) is set. When the processor 150 determines the mobile device 100 is still or moving below the threshold (at a value less than the magnitude threshold) with respect to the cradle, the second threshold ($\omega_{max}$) is set based on a division of the magnitude ($\|\vec{V}\|$) and the minimum radius of curvature ($R_{min}$) expected of a car 10 as shown at step 630.

When the processor 150 determines the mobile device 100 is moving or rotating (at a value greater than the magnitude threshold) relative to the cradle, the second threshold ($\omega_{max}$) is set based on a division of the maximum acceleration ($a_{max}$) expected of a car 10 and the magnitude ($\|\vec{V}\|$) as shown at step 640. Therefore, a selection of how the second threshold ($\omega_{max}$) is set is based on whether the car 10 is nearly still $$\left(\omega_{max} = \frac{\|\vec{V}\|}{R_{min}}\right) \text{ or in motion } \left(\omega_{max} = \frac{a_{max}}{\|\vec{V}\|}\right).$$

At step 650, the processor 150 compares a magnitude of the angular rotation rate ($\|\vec{\omega}\|$) from the gyroscope 130 to this second threshold ($\omega_{max}$). If the magnitude of the angular rotation rate ($\|\vec{\omega}\|$) is greater than the second threshold ($\omega_{max}$) the processor 150 may take no interruptive acts and declare that the cradle has experienced no or insignificant cradle rotation, as shown at step 660. If the magnitude of the angular rotation rate ($\|\vec{\omega}\|$) is less than the second threshold ($\omega_{max}$), the processor 150 declares that the mobile device 100 has recently been moved within the cradle as shown at step 670.

At step 680, the processor 150 may de-weight any results that are based on measurements from the sensor 110 until the relative orientation between the local reference system of the car 10 and the body reference system of the mobile device 100 may be reassessed. As an alternative to de-weighting results, the processor 150 may bar the use of sensor measurements altogether and reset any ongoing computation until the relative position of the mobile device 100 in the cradle or mount may be determined again.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method in a mobile device for detecting cradle rotation of a cradle on which the mobile device is mounted, the method comprising:
   determining a threshold based on a GNSS magnitude;
   comparing an angular rotation rate to the threshold;
   determining a cradle rotation state based on the comparison; and
   declaring, by the mobile device, the cradle rotation state, wherein the cradle rotation state comprises an indication of whether the mobile device mounted on the cradle has been rotated relative to a frame of reference.

2. The method of claim 1, wherein the angular rotation rate is based on gyroscope measurements.

3. The method of claim 1, wherein the determining the threshold comprises:
   comparing a magnitude of a velocity to a velocity threshold; and
   determining the threshold based on the magnitude comparison.

4. The method of claim 3, wherein the magnitude of the velocity comprises a magnitude of a velocity from a GNSS receiver.

5. The method of claim 3, wherein determining the threshold comprises:
   setting the threshold based on a minimum radius of curvature when the magnitude comparison is low and based on a maximum acceleration when the magnitude comparison is high.

6. The method of claim 3, wherein the angular rotation rate is based on gyroscope measurements.

7. The method of claim 1, further comprising writing a parameter based on the cradle rotation state.

8. The method of claim 1, further comprising saving the cradle rotation state.

9. The method of claim 1, further comprising resetting at least one ongoing computation until a redetermination of the cradle rotation state, when the cradle rotation state indicates that the mobile device mounted on the cradle has been rotated relative to the frame of reference.

10. The method of claim 1, further comprising de-weighting results of at least one ongoing computation until a redetermination of the cradle rotation state, when the cradle rotation state indicates that the mobile device mounted on the cradle has been rotated relative to the frame of reference.

11. The method of claim 1, further comprising barring use of sensor measurements until a redetermination of the cradle rotation state, when the cradle rotation state indicates that the mobile device mounted on the cradle has been rotated relative to the frame of reference.

12. A mobile device to detect cradle rotation of a cradle on which the mobile device is mounted, the mobile device comprising:
   an inertial measurement unit comprising an accelerometer and a gyroscope;
   a Global Navigation Satellite Systems receiver (GNSS receiver);
   a processor coupled to the inertial measurement unit and the GNSS receiver; and
   memory coupled to the processor, comprising code for:
      determining a threshold based on a GNSS magnitude of a velocity;
      comparing an angular rotation rate to the threshold;
      determining a cradle rotation state based on the comparison; and
      declaring, by the mobile device, the cradle rotation state, wherein the cradle rotation state comprises an indication of whether the mobile device mounted on the cradle has been rotated relative to a frame of reference.

13. The mobile device of claim 12, wherein the angular rotation rate is based on gyroscope measurements.

14. The mobile device of claim 12, wherein the determining the threshold comprises:

comparing a magnitude of a velocity to a velocity threshold; and determining the threshold based on the magnitude comparison.

15. The mobile device of claim 14, wherein the magnitude of the velocity comprises a magnitude of a velocity from a GNSS receiver.

16. The mobile device of claim 14, wherein determining the threshold comprises:

setting the threshold based on a minimum radius of curvature when the magnitude comparison is low and based on a maximum acceleration when the magnitude comparison is high.

17. The mobile device of claim 14, wherein the angular rotation rate is based on gyroscope measurements.

18. A mobile device to detect cradle rotation of a cradle on which the mobile device is mounted, the mobile device comprising:

means for determining a threshold based on a GNSS magnitude of a velocity;

means for comparing an angular rotation rate to the threshold;

means for determining a cradle rotation state based on the comparison; and means for declaring, by the mobile device, the cradle rotation state, wherein the cradle rotation state comprises an indication of whether the mobile device mounted on the cradle has been rotated relative to a frame of reference.

19. A device mounted on a cradle, the device comprising a processor and a memory wherein the memory includes software instructions for:

determining a threshold based on a GNSS magnitude;

comparing an angular rotation rate to the threshold;

determining a cradle rotation state based on the comparison; and declaring, by the device, the cradle rotation state, wherein the cradle rotation state comprises an indication of whether the mobile device mounted on the cradle has been rotated relative to a frame of reference.

20. A non-transitory computer-readable storage medium including program code stored thereon for detecting cradle rotation of a cradle on which the mobile device is mounted, the program code comprising instructions for:

determining a threshold based on a GNSS magnitude;

comparing an angular rotation rate to the threshold;

determining a cradle rotation state based on the comparison; and declare, by the mobile device, the cradle rotation state, wherein the cradle rotation state comprises an indication of whether the mobile device mounted on the cradle has been rotated relative to a frame of reference.

* * * * *